United States Patent
Yoshioka et al.

(10) Patent No.: US 12,245,245 B2
(45) Date of Patent: Mar. 4, 2025

(54) TERMINAL, BASE STATION, COMMUNICATION METHOD, AND COMMUNICATION SYSTEM FOR CONTROLLING HYBRID AUTOMATIC REPEAT REQUEST (HARQ) RESPONSE BASED ON REPORT OF HARQ RESPONSE INFORMATION

(71) Applicant: NTT DOCOMO, INC., Tokyo (JP)

(72) Inventors: Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 337 days.

(21) Appl. No.: 17/772,927

(22) PCT Filed: Nov. 8, 2019

(86) PCT No.: PCT/JP2019/044028
§ 371 (c)(1),
(2) Date: Apr. 28, 2022

(87) PCT Pub. No.: WO2021/090510
PCT Pub. Date: May 14, 2021

(65) Prior Publication Data
US 2023/0034776 A1    Feb. 2, 2023

(51) Int. Cl.
*H04W 72/23*    (2023.01)
*H04L 1/1812*    (2023.01)

(52) U.S. Cl.
CPC .......... *H04W 72/23* (2023.01); *H04L 1/1812* (2013.01)

(58) Field of Classification Search
CPC .... H04W 72/23; H04W 92/18; H04L 1/1812; H04L 1/1685; H04L 1/1861; H04L 1/1864
See application file for complete search history.

(56) References Cited

U.S. PATENT DOCUMENTS

2020/0396024 A1* 12/2020 Ganesan ............... H04L 1/1819
2021/0050950 A1*  2/2021 Zhou .................... H04W 76/14
2022/0360374 A1* 11/2022 Yoshioka .............. H04L 1/1896
2023/0034776 A1*  2/2023 Yoshioka .............. H04L 1/1864

OTHER PUBLICATIONS

Office Action issued in Japanese Patent Application No. 2021-554799, mailed on Aug. 22, 2023 (6 pages).
Office Action issued in counterpart Chinese Patent Application No. 201980101863.9 mailed on Jun. 8, 2023 (14 pages).
Extended European Search Report issued in counterpart European Application No. 19952067.7 mailed on Jun. 19, 2023 (9 pages).
(Continued)

*Primary Examiner* — Benjamin H Elliott, IV
(74) *Attorney, Agent, or Firm* — Osha Bergman Watanabe & Burton LLP

(57) ABSTRACT

A terminal includes a reception unit that receives DL (Downlink) control information for allocating a SL (Sidelink) resource, from a base station, a transmission unit that transmits data in the SL resource to another terminal, and transmits a HARQ (Hybrid automatic repeat request) response corresponding to the SL resource or the data to the base station, and a control unit that determines a control related to the HARQ response, based on presence or non-presence of a transport block to be transmitted in the SL resource.

5 Claims, 16 Drawing Sheets

(56) References Cited

OTHER PUBLICATIONS

Ericsson; "Uu-based sidelink resources allocation"; 3GPP TSG-RAN WG1 Meeting #98bis, R1-1910533; Chongqing, China; Oct. 14-20, 2019 (22 pages).
3GPP TR 22.886 V15.1.0, "3rd Generation Partnership Project; Technical Specification Group Services and System Aspects; Study on enhancement of 3GPP Support for 5G V2X Services, (Release 15)", Mar. 2017 (58 pages).
LG Electronics, "Discussion on NR sidelink resource allocation for Mode 1", 3GPP TSG RAN WG1 #98bis Meeting, R1-1910778, Chongqing, China, Oct. 14-20, 2019 (11 pages).
3GPP TS 36.211 V15.7.0, "3rd Generation Partnership Project; Technical Specification Group Radio Access Network; Evolved Universal Terrestrial Radio Access (E-UTRA); Physical channels and modulation, (Release 15)", Sep. 2019 (240 pages).
International Search Report issued in International Application PCT/JP2019/044028 mailed on Jul. 14, 2020 (4 pages).
Written Opinion issued in International Application PCT/JP2019/044028 mailed on Jul. 14, 2020 (3 pages).
Office Action issued in counterpart Japanese Patent Application No. 2021-554799 mailed on Jan. 16, 2024 (8 pages).
Fujitsu; "Discussion on mode 1 resource allocation for NR V2X"; 3GPP TSG RAN WG1 #98bis, R1-1910135; Chongqing, China; Oct. 14-20, 2019 (10 pages).

\* cited by examiner

TERMINAL, BASE STATION, COMMUNICATION METHOD, AND COMMUNICATION SYSTEM FOR CONTROLLING HYBRID AUTOMATIC REPEAT REQUEST (HARQ) RESPONSE BASED ON REPORT OF HARQ RESPONSE INFORMATION

TECHNICAL FIELD

The present invention relates to a terminal and a communication method in a wireless communication system.

BACKGROUND ART

In the LTE (Long Term Evolution) and LTE successor systems (for example, LTE-A (LTE Advanced), NR (New Radio) (also referred to as 5G)), a D2D (Device to Device) technology in which the terminals communicate directly with each other without a base station intervention is being discussed (for example, Non-Patent Document 1).

The D2D reduces the traffic between the terminal and the base station, and enables communication between the terminals even when the base station is unable to communicate in the event of a disaster, or the like. Although the 3GPP (3rd Generation Partnership Project) refers to the D2D as a "sidelink (sidelink)", the more generally used term D2D is used in this specification. However, in the description of the embodiment described below, the term sidelink is also used, as appropriate.

The D2D communication is generally classified into D2D discovery (D2D "hakken" in Japanese) for discovering other communicable terminals, and D2D communication (D2D direct communication, D2D communication, direct communication between terminals, or the like) for communicating directly between the terminals. Hereinafter, when not specifically distinguishing between D2D communication, D2D discovery, or the like, these will simply be referred to as D2D. In addition, a signal transmitted and received via D2D will be referred to as a D2D signal. Various use cases of V2X (Vehicle to Everything) services in the NR are being discussed (for example, Non-Patent Document 2).

PRIOR ART DOCUMENTS

Non-Patent Documents

Non-Patent Document 1: 3GPP TS 36.211 V15.7.0 (2019-09)

Non-Patent Document 2: 3GPP TR 22.886 V15.1.0 (2017-03)

DISCLOSURE OF THE INVENTION

Problem to be Solved by the Invention

Direct communication between terminals in the NR-V2X supports a HARQ (Hybrid automatic repeat request) feedback. The terminal may receive, from another terminal, the HARQ feedback corresponding to the sidelink resource scheduled from the base station, and transmit the HARQ feedback to the base station. However, when a configured grant (configured grant) or a dynamic grant (dynamic grant) is provided from the base station, and the TB (Transport block) to be transmitted does not arrive from an upper layer, it is unclear whether to report a corresponding HARQ-ACK to the base station, and which control is to be performed for the report.

The present invention was conceived in view of the foregoing, and one object is to determine the process related to a HARQ (Hybrid Automatic Repeat Request) feedback, when the TB (Transport block) to be transmitted in the granted resource.

Means of Solving the Problem

According to the disclosed technique, there is provided a terminal that includes a reception unit that receives DL (Downlink) control information for allocating a SL (Sidelink) resource, from a base station; a transmission unit that transmits data in the SL resource to another terminal, and transmits a HARQ (Hybrid automatic repeat request) response corresponding to the SL resource or the data to the base station; and a control unit that determines a control related to the HARQ response, based on presence or non-presence of a transport block to be transmitted in the SL resource.

EFFECTS OF THE INVENTION

According to the disclosed technique, it is possible to determine the process related to the HARQ (Hybrid Automatic Repeat Request) feedback, when the TB (Transport block) to be transmitted is not present in the granted resource.

MODE OF CARRYING OUT THE INVENTION

Hereinafter, embodiments of the present invention will be described with reference to the drawings. The embodiments described below are examples, and the embodiments to which the present invention is applied are not limited to the following embodiments.

During operation of a wireless communication system according to one embodiment of the present invention, existing techniques may be used, as appropriate. The existing techniques include the existing LTE, for example, but is not limited to the existing LTE. In addition, the term "LTE" used in this specification has a broad meaning that includes LTE-Advanced, and systems (for example, NR) subsequent to the LTE-Advanced, or wireless LAN (Local Area Network), unless otherwise indicated.

In the embodiments of the present invention, the DX (Duplex) system may be the TDD (Time Division Duplex) system, the FDD (Frequency Division Duplex) method, or other systems (for example, Flexible Duplex, or the like).

Further, in the embodiments of the present invention, "configuring (configure)" a wireless parameter or the like may refer to an operation to pre-configuring (pre-configure) a predetermined value, or to be configured with the wireless parameter indicated by a base station 10 or a terminal 20.

Figure 1:
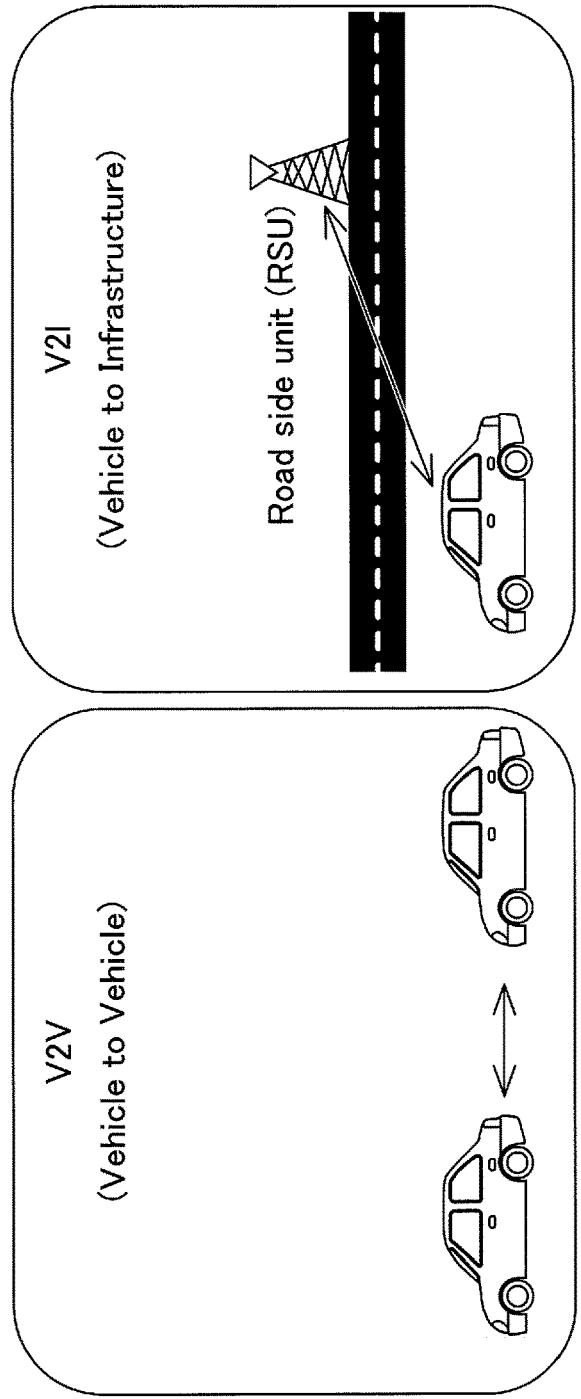
FIG. 1 is a diagram for explaining a V2X.

FIG. 1 is a diagram for explaining the V2X. In the 3GPP, studies to realize V2X (Vehicle to Everything) or eV2X (enhanced V2X) by extending the D2D function, and specifications thereof, are being discussed. As illustrated in FIG. 1, the V2X is a part of ITS (Intelligent Transport Systems), and is a generic term for V2V (Vehicle to Vehicle) indicating the form of communication between vehicles, V2I (Vehicle to Infrastructure) indicating the form of communication between a vehicles and an RSU (Road-Side Unit), V2N (Vehicle to Network) indicating the form of communication between a vehicles and an ITS server, and V2P (Vehicle to Pedestrian) indicating the form of communication between a vehicle and a mobile terminal carried by a pedestrian.

In addition, in the 3GPP, the V2X using cellular communication and terminal-to-terminal communication of LTE or NR is being studied. The V2X using the cellular communication is also referred to as cellular V2X. In the V2X using the NR, studies on realizing a large capacity, a low delay, a high reliability, and a QoS (Quality of Service) control are being promoted.

It may be assumed that the studies on the V2X using LTE or NR will not be limited to the 3GPP specifications in the future. For example, it may be assumed that studies will be made on securing interoperability, cost reduction by upper layer implementation, a plurality of RAT (Radio Access Technology) combination or switching methods, regulatory compliance in each country, data acquisition, distribution, database management, and utilization methods of the LTE or NR V2X platforms.

In the embodiments of the present invention, it is primarily assumed that a communication device is mounted on a vehicle, but embodiments of the present invention are not limited to such embodiments. For example, the communication device may be a terminal carried by a person, or the communication device may be a drone or airplane mounted device, or the communication device may be a base station, an RSU, a relay station (relay node), a terminal having scheduling capability, or the like.

The SL (Sidelink) may be distinguished on the basis of either the UL (Uplink) or the DL (Downlink), and one of, or combinations of, the following 1)-4). The SL may have another name.

1) Resource allocation in the time domain
2) Resource allocation in the frequency domain
3) Synchronization signal (including SLSS (Sidelink Synchronization Signal) to be referenced)
4) Reference signal used for path loss measurement for transmission power control In addition, for the OFDM (Orthogonal Frequency Division Multiplexing) of the SL or UL, any one of CP-OFDM (Cyclic-Prefix OFDM), DFT-S-OFDM (Discrete Fourier Transform-Spread-OFDM), OFDM without transform precoding, and OFDM with transform precoding, may be applied.

In the SL of the LTE, Mode3 and Mode4 are prescribed with respect to allocating the SL resource to the terminal 20. In Mode3, a transmission resource is dynamically allocated by DCI (Downlink Control Information) transmitted from the base station 10 to the terminal 20. In Mode3, a SPS (Semi Persistent Scheduling) is also possible. In Mode4, the terminal 20 autonomously selects the transmission resource from a resource pool.

A slot in the embodiments of the present invention may be alternatively referred to as a symbol, a minislot, a subframe, a wireless frame, and a TTI (Transmission Time Interval). A cell in the embodiments of the present invention may be alternatively referred to as a cell group, a carrier component, a BWP, a resource pool, a resource, a RAT (Radio Access Technology), a system (including wireless LAN), or the like.

Figure 2:
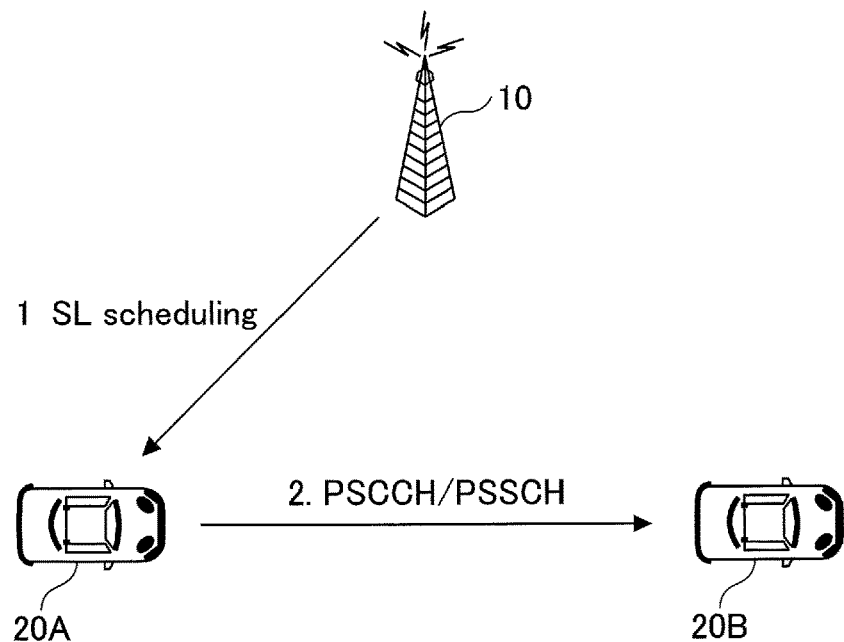
FIG. 2 is a diagram for explaining an example (1) of a transmission mode of the V2X.

FIG. 2 is a diagram for explaining an example (1) of a V2X transmission mode . In a transmission mode of a sidelink communication illustrated in FIG. 2, in step 1, the base station 10 transmits a sidelink scheduling to a terminal 20A. Subsequently, the terminal 20A transmits a PSCCH (Physical Sidelink Control Channel) and a PSSCH (Physical Sidelink Shared Channel) to a terminal 20B based on the received scheduling (step 2). The transmission mode of the sidelink communication illustrated in FIG. 2 may be referred to as a sidelink transmission mode 3 of the LTE. In the sidelink transmission mode 3 of the LTE, a Uu-based sidelink scheduling is performed. The Uu is a wireless interface between a UTRAN (Universal Terrestrial Radio Access Network) and a UE (User Equipment). The transmission mode of the sidelink communication illustrated in FIG. 2 may be referred to as the sidelink transmission mode 1 of the NR.

Figure 3:
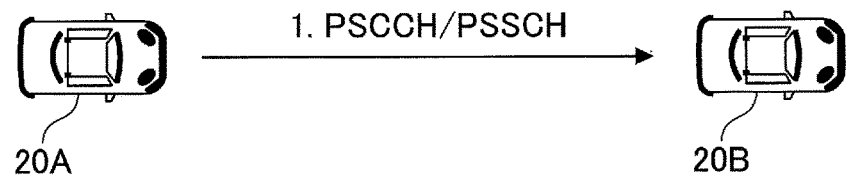
FIG. 3 is a diagram for explaining an example (2) of the transmission mode of the V2X.

FIG. 3 is a diagram for explaining an example (2) of the transmission mode of the V2X. In the transmission mode of the sidelink communication illustrated in FIG. 3, in step 1, the terminal 20A transmits the PSCCH and PSSCH to the terminal 20B using the autonomously selected resource. The transmission mode of the sidelink communication illustrated in FIG. 3 may be referred to as the sidelink transmission mode 4 of the LTE. In the sidelink transmission mode 4 of the LTE, the UE itself performs resource selection.

Figure 4:
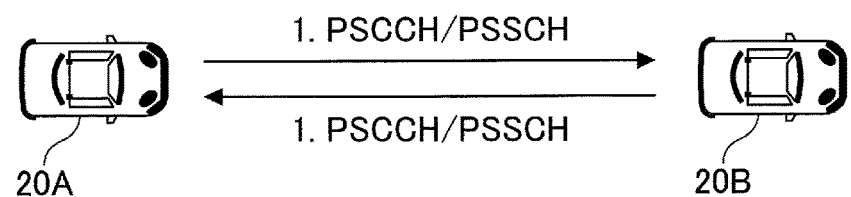
FIG. 4 is a diagram for explaining an example (3) of the transmission mode of the V2X.

FIG. 4 is a diagram for explaining an example (3) of the transmission mode of the V2X. In the transmission mode of the sidelink communication illustrated in FIG. 4, in step 1, the terminal 20A transmits the PSCCH and PSSCH to the terminal 20B using the autonomously selected resource. Similarly, the terminal 20B transmits the PSCCH and PSSCH to the terminal 20A using the autonomously selected resource (step 1). The transmission mode of the sidelink communication illustrated in FIG. 4 may be referred to as the sidelink transmission mode 2a of the NR. In the sidelink transmission mode 2 of the NR, the terminal 20 itself performs resource selection.

Figure 5:
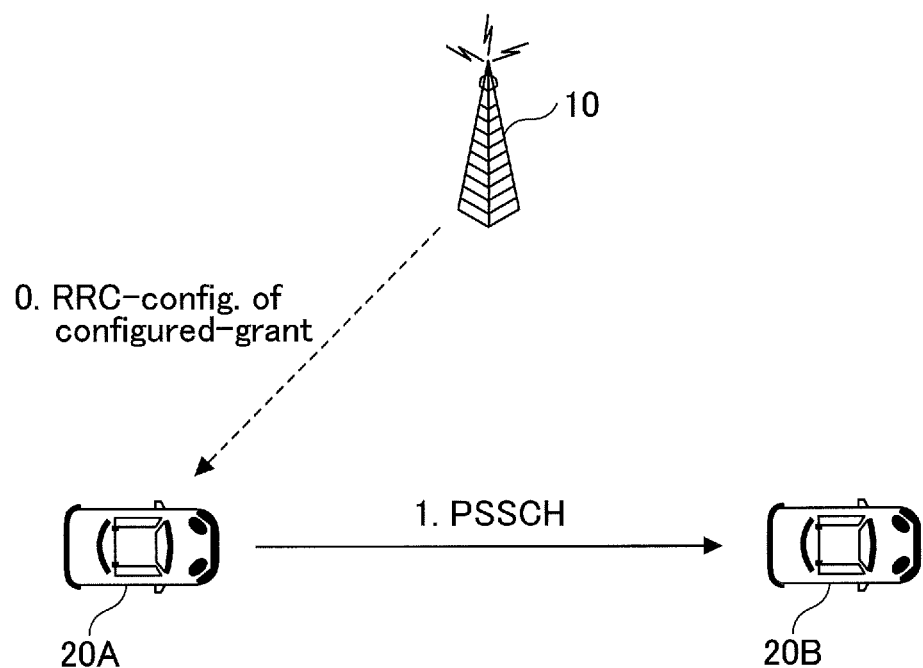
FIG. 5 is a diagram for explaining an example (4) of the transmission mode of the V2X.

FIG. 5 is a diagram for explaining an example (4) of the transmission mode of the V2X. In the transmission mode of the sidelink communication illustrated in FIG. 5, in step 0, the base station 10 transmits a sidelink grant to the terminal 20A via an RRC (Radio Resource Control) configuration. Subsequently, in step 1, the terminal 20A transmits the PSSCH to the terminal 20B based on the received resource pattern. The transmission mode of the sidelink communication illustrated in FIG. 5 may be referred to as the sidelink transmission mode 2c of the NR.

Figure 6:
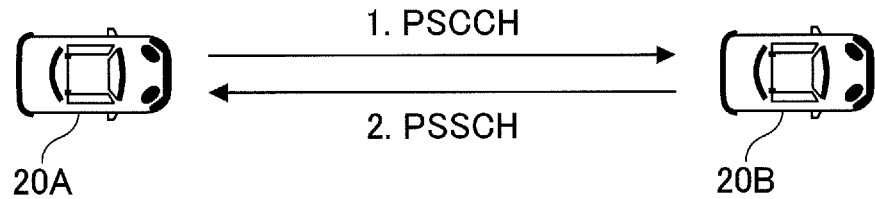
FIG. 6 is a diagram for explaining an example (5) of the transmission mode of the V2X.

FIG. 6 is a diagram for explaining an example (5) of the transmission mode of the V2X. In the transmission mode of the sidelink communication illustrated in FIG. 6, in step 1, the terminal 20A transmits the sidelink scheduling to the terminal 20B via the PSCCH. Subsequently, in step 2, the terminal 20B transmits the PSSCH to the terminal 20A based on the received scheduling. The transmission mode of the sidelink communication illustrated in FIG. 6 may be referred to as the sidelink transmission mode 2d of the NR.

Figure 7:
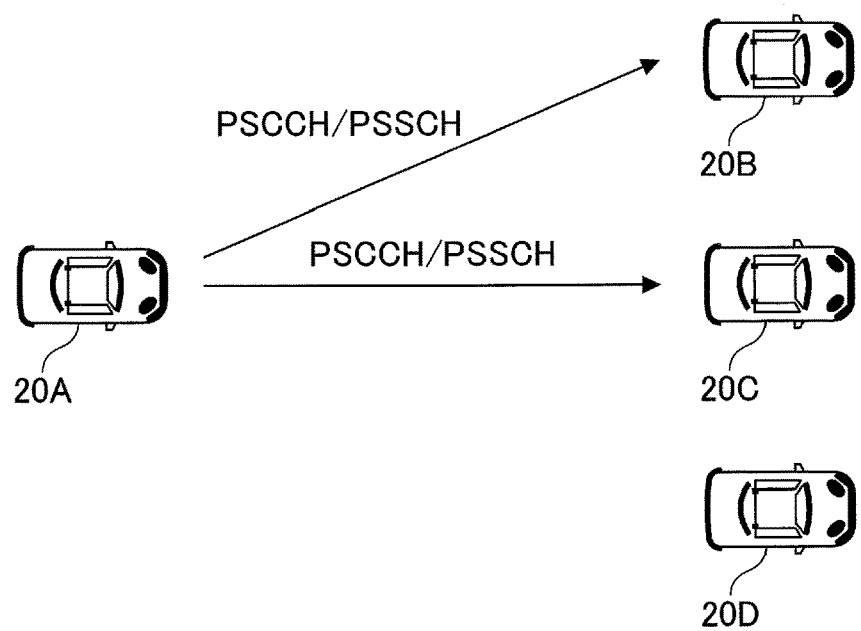
FIG. 7 is a diagram for explaining an example (1) of a communication type of the V2X.

FIG. 7 is a diagram for explaining an example (1) of a communication type of the V2X. The sidelink communication type illustrated in FIG. 7 is unicast. The terminal 20A transmits the PSCCH and PSSCH to the terminal 20. In the example illustrated in FIG. 7, the terminal 20A unicasts to the terminal 20B, and unicasts to a terminal 20C.

Figure 8:
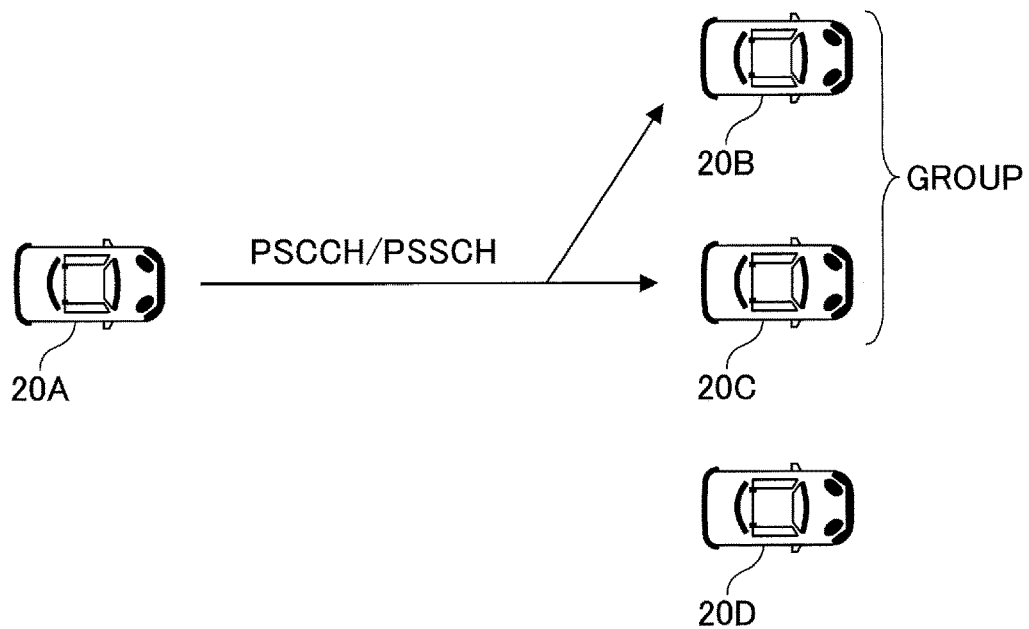
FIG. 8 is a diagram for explaining an example (2) of the communication type of the V2X.

FIG. 8 is a diagram for explaining an example (2) of the communication type of the V2X. The sidelink communication type illustrated in FIG. 8 is group cast. The terminal 20A transmits the PSCCH and PSSCH to a group to which one or a plurality of terminals 20 belong. In the example illustrated in FIG. 8, the group includes the terminal 20B and the terminal 20C, and the terminal 20A group casts to the group.

Figure 9:
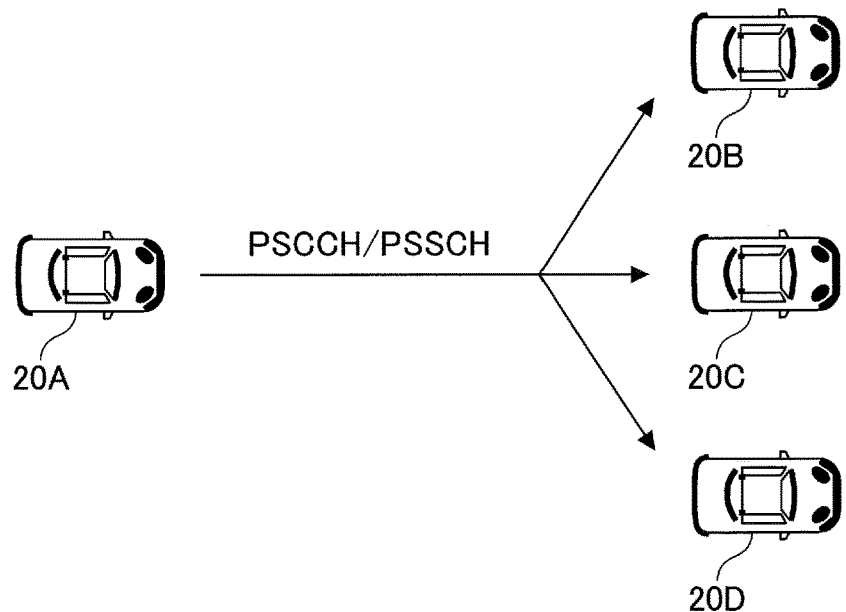
FIG. 9 is a diagram for explaining an example (3) of the communication type of the V2X.

FIG. 9 is a diagram for explaining an example (3) of the communication type of the V2X. The sidelink communication type illustrated in FIG. 9 is broadcast. The terminal 20A transmits the PSCCH and PSSCH to one or a plurality of terminals 20. In the example illustrated in FIG. 9, the terminal 20A broadcasts to the terminal 20B, the terminal 20C, and a terminal 20D. The terminal 20A illustrated in FIG. 7 trough FIG. 9 may be referred to as a header UE (header-UE).

In addition, in the NR-V2X, it is assumed that a HARQ (Hybrid automatic repeat request) is supported by the unicast and the group cast of the sidelink. Moreover, in the NR-V2X, SFCI (Sidelink Feedback Control Information), including a HARQ response, is defined. Further, SFCI transmission via a PSFCH (Physical Sidelink Feedback Channel) is being discussed.

In the following description, the PSFCH is used in the transmission of a HARQ-ACK by the sidelink, but this is only an example. For example, the PSCCH may be used to transmit the HARQ-ACK by the sidelink, the PSSCH may be used to transmit the HARQ-ACK by the sidelink, or other channels may be used to transmit the HARQ-ACK by the sidelink.

Hereinafter, for the sake of convenience, the information in general, reported by the terminal 20 in the HARQ, is referred to as a HARQ-ACK. This HARQ-ACK may also be referred to as HARQ-ACK information. More particularly, a codebook applied to the information of the HARQ-ACK reported from the terminal 20 to the base station 10 or the like is called a HARQ-ACK codebook. The HARQ-ACK codebook prescribes a bit string of the HARQ-ACK information. By "HARQ-ACK", not only an ACK, but also a NACK may be transmitted.

Figure 10:
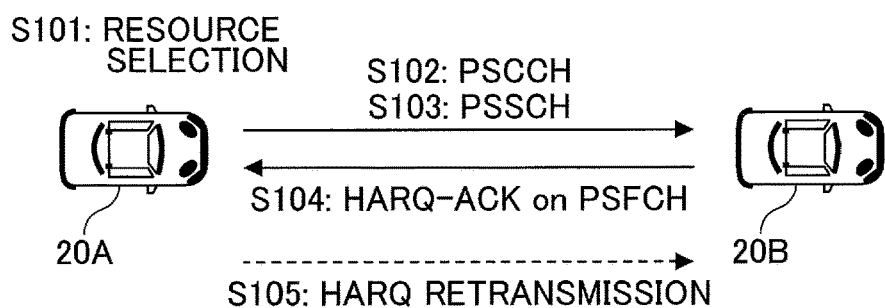
FIG. 10 is a diagram illustrating an operation example (1) according to one embodiment of the present invention.

FIG. 10 is a diagram illustrating an example (1) of the configuration and operation of a wireless communication system according to one embodiment of the present invention. As illustrated in FIG. 10, the wireless communication system according to the embodiment of the present invention includes the terminal 20A and the terminal 20B. In practice, a large number of user devices exist, but FIG. 10 illustrates the terminal 20A and the terminal 20B as examples of such user devices.

Hereinafter, when the terminals 20A, 20B, or the like are not particularly distinguished, the terminal will be referred to as a "terminal 20" or a "user device". FIG. 10 illustrates, as an example, a case where both the terminal 20A and the terminal 20B are within a cell coverage, but the operation according to the embodiment of the present invention can also be applied to a case where the terminal 20B is outside the coverage.

As described above, in this embodiment, the terminal 20 is, for example, a device mounted in a vehicle such as an automobile, and has a cellular communication function as the UE of the LTE or NR, and a sidelink function. The terminal 20 may be a general portable terminal (smartphone or the like). The terminal 20 may also be an RSU. The RSU may be a UE-type RSU having the function of the UE or a gNB-type RSU having the function of a base station device.

The terminal 20 does not necessarily have to be a device in a single housing. For example, even when various sensors are scattered inside the vehicle, the device including the various sensors may be the terminal 20.

Processing contents of the transmission data of the sidelink of the terminal 20 are basically the same as the processing contents of the UL transmission in the LTE or NR. For example, the terminal 20 scrambles a code word of the transmission data, then modulates to generate complex-valued symbols, and maps the complex-valued symbols to one or two layers, to perform precoding. The precoded complex-valued symbols are then mapped to a resource element, to generate a transmission signal (for example, a complex-valued time-domain SC-FDMA signal), and the transmission signal is transmitted from each antenna port.

The base station 10 has a cellular communication function of the base station in the LTE or NR, and a function (for example, resource pool setting, resource allocation, or the like) for enabling communication of the terminal 20 according to this embodiment. In addition, the base station 10 may be the RSU (gNB-type RSU).

Further, in the wireless communication system according to the embodiment of the present invention, a signal waveform used by the terminal 20 for the SL or UL may be the OFDMA, the SC-FDMA, or other signal waveforms.

In step S101, the terminal 20A autonomously selects the resource to be used for the PSCCH and PSSCH from a resource selection window having a predetermined duration. The resource selection window may be set from the base station 10 to the terminal 20.

In step S102 and step S103, the terminal 20A transmits SCI (Sidelink Control Information) by the PSCCH, and transmits the SL data by the PSSCH, using the resource autonomously selected in step 5101. For example, the terminal 20A may transmit the SCI (PSCCH) using a frequency resource adjacent to a PSSCH frequency resource with the same time resource as a time resource of the PSSCH.

The terminal 20B receives the SCI (PSCCH) and the SL data (PSSCH) transmitted from the terminal 20A. The SCI received by the PSCCH may include information about the PSFCH resource for the terminal 20B to transmit the HARQ-ACK in response to the receipt of the data. The terminal 20A may include the information of the autonomously selected resource in the SCI when transmitting the SCI.

In step S104, the terminal 20B transmits the HARQ-ACK in response to the received data, to the terminal 20A using the PSFCH resource specified in the received SCI.

In step S105, when the HARQ-ACK received in step S104 indicates a requests for retransmission, that is, a NACK (negative response) is received, the terminal 20A retransmits the PSCCH and PSSCH to the terminal 20B. The terminal 20A may retransmit the PSCCH and PSSCH using the autonomously selected resource.

In a case where a HARQ control is not performed, step S104 and step S105 need not be performed.

Figure 11:
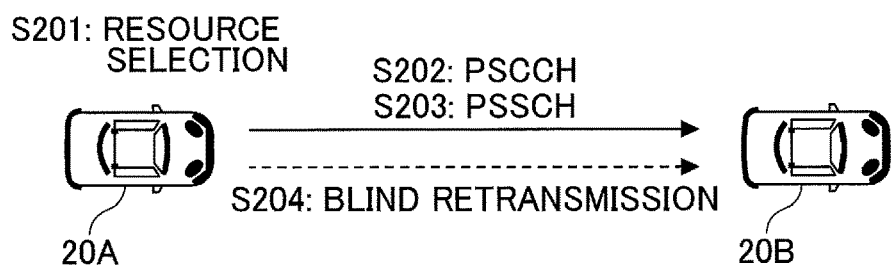
FIG. 11 is a diagram illustrating an operation example (2) according to one embodiment of the present invention.

FIG. 11 is a diagram illustrating an example (2) of the configuration and operation of the wireless communication system according to one embodiment of the present invention. A blind retransmission may be performed, without the HARQ control to improve the transmission success rate or range of reach.

In step S201, the terminal 20A autonomously selects the resource to be used for the PSCCH and PSSCH from the resource selection window having the predetermined duration. The resource selection window may be set from the base station 10 to the terminal 20.

In step S202 and step S203, the terminal 20A transmits the SCI by the PSCCH and transmits the SL data by the PSSCH, using the resource autonomously selected in step S201. For example, the terminal 20A may transmit the SCI (PSCCH) using the frequency resource adjacent to the PSSCH frequency resource with the same time resource as the time resource of the PSSCH.

In step S204, the terminal 20A retransmits the SCI via PSCCH and the SL data via PSSCH to the terminal 20B using the resource autonomously selected in step S201. The retransmission in step S204 may be performed a plurality of times.

In a case where the blind retransmission is not performed, step S204 need not be performed.

Figure 12:
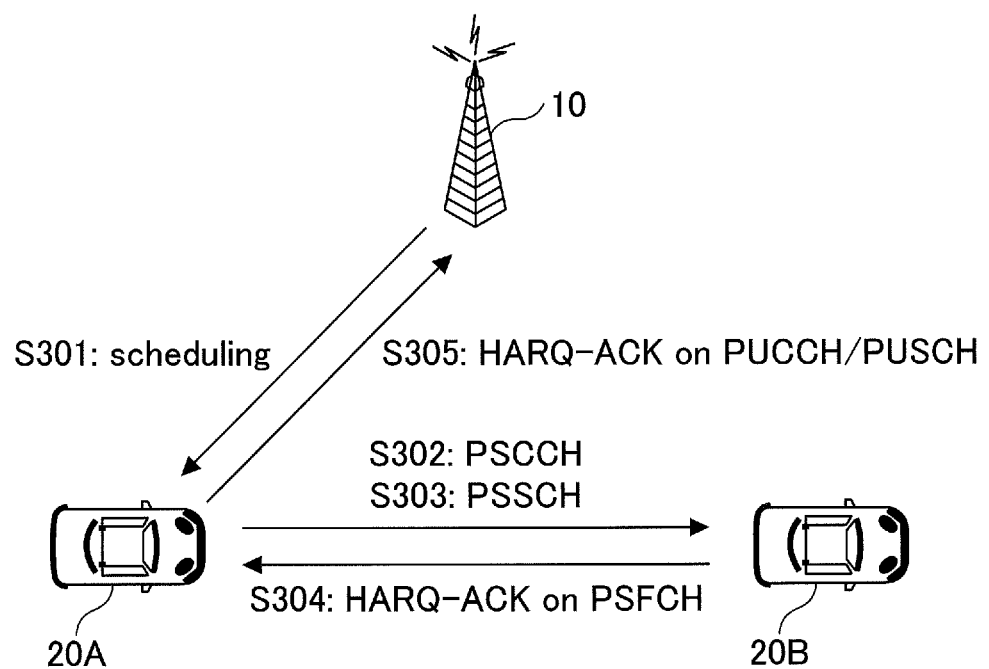
FIG. 12 is a diagram illustrating an operation example (3) according to one embodiment of the present invention.

FIG. 12 is a diagram illustrating an example (3) of the configuration and operation of the wireless communication system according to one embodiment of the present invention. The base station 10 may perform the scheduling of the sidelink. That is, the base station 10 may determine the sidelink resource to be used by the terminal 20, and transmit information indicating the resource to the terminal 20. In addition, in a case where the HARQ control is applied, the base station 10 may transmit information indicating the HSFCH resource to the terminal 20.

In step S301, the base station 10 performs an SL scheduling by transmitting DCI (Downlink Control Information) to the terminal 20A by the PDCCH. Hereinafter, for the sake of convenience, the DCI for the SL scheduling may be referred to as the SL scheduling DCI.

In addition, in step S301, it is assumed that the base station 10 also transmits the DCI for a DL scheduling (may also be referred to as a DL assignment) to the terminal 20A by the PDCCH. Hereinafter, for the sake of convenience, the DCI for the DL scheduling may be referred to as the DL scheduling DCI. The terminal 20A that receives the DL scheduling DCI, receives the DL data by the PDSCH using the resource specified by the DL scheduling DCI.

In step S302 and step S303, the terminal 20A transmits an SCI (Sidelink Control Information) via PSCCH using the resource specified by the SL scheduling DCI, and also transmits the SL data by the PSSCH. In the SL scheduling DCI, it is possible to specify only the PSSCH resource. In this case, the terminal 20A, for example, may transmit the SCI (PSCCH) using the frequency resource adjacent to the PSSCH frequency resource with the same time resource as the PSSCH time resource.

The terminal 20B receives the SCI (PSCCH) and the SL data (PSSCH) transmitted from the terminal 20A. The SCI received by the PSCCH includes information about the PSFCH resource for the terminal 20B to transmit the HARQ-ACK in response to the receipt of the data.

The information of the resource is included in the DL scheduling DCI or the SL scheduling DCI transmitted from the base station 10 in step S301, and the terminal 20A acquires the information of the resource from the DL scheduling DCI or the SL scheduling DCI and includes the acquired information in the SCI. Alternatively, the DCI transmitted from the base station 10 may not include the information of the resource, and the terminal 20A may autonomously include the information of the resource in the SCI and transmit the information of the resource.

In step S304, the terminal 20B transmits the HARQ-ACK with respect to the received data to the terminal 20A using the PSFCH resource specified by the received SCI.

In step S305, the terminal 20A transmits the HARQ-ACK using a PUCCH (Physical uplink control channel) resource specified by the DL scheduling DCI (or SL scheduling DCI) at a timing (for example, a timing in units of slots) specified by the DL scheduling DCI, for example, and the base station 10 receives the HARQ-ACK. The HARQ-ACK codebook may include the HARQ-ACK received from the terminal 20B, and the HARQ-ACK with respect to the DL data. However, the HARQ-ACK with respect to the DL data is not included in the HARQ-ACK codebook when there is no DL data assignment.

When the HARQ control is not performed, step S304 and step S305 need not be performed.

As described above, in the NR sidelink transmission mode 1, the base station 10 may perform the sidelink scheduling, and the terminal 20 may transmit the sidelink HARQ-ACK to the base station 10. The terminal 20 may multiplex a plurality of sidelink HARQ-ACKs, and transmit the multiplexed sidelink HARQ-ACKs to the base station 10 using a single PUCCH. Further, the terminal 20 may multiplex one or a plurality of sidelink HARQ-ACKs and one or a plurality of downlink HARQ-ACKs, and transmit the multiplexed sidelink and downlink HARQ-ACKs to the base station 10 using a single PUCCH. In the present invention, the sidelink HARQ-ACK may refer to a HARQ-ACK corresponding to a signal of the sidelink (for example, transport block, sidelink resource, PSCCH/PSSCH). Moreover, the downlink HARQ-ACK may refer to a HARQ-ACK corresponding to a signal of the downlink (for example, transport block, PDSCH).

In addition, the terminal 20 may transmit one or a plurality of sidelink HARQ-ACKs to the base station 10 via a PUSCH (Physical Uplink shared channel). That is, the terminal 20 may transmit the sidelink HARQ-ACK to the base station 10 via the PUSCH when the PUCCH including the sidelink HARQ-ACK and the PUSCH collide at least in the time domain. The sidelink HARQ-ACK codebook supports the semistatic type 1 and the dynamic type 2 similar to those of the downlink.

Figure 13:
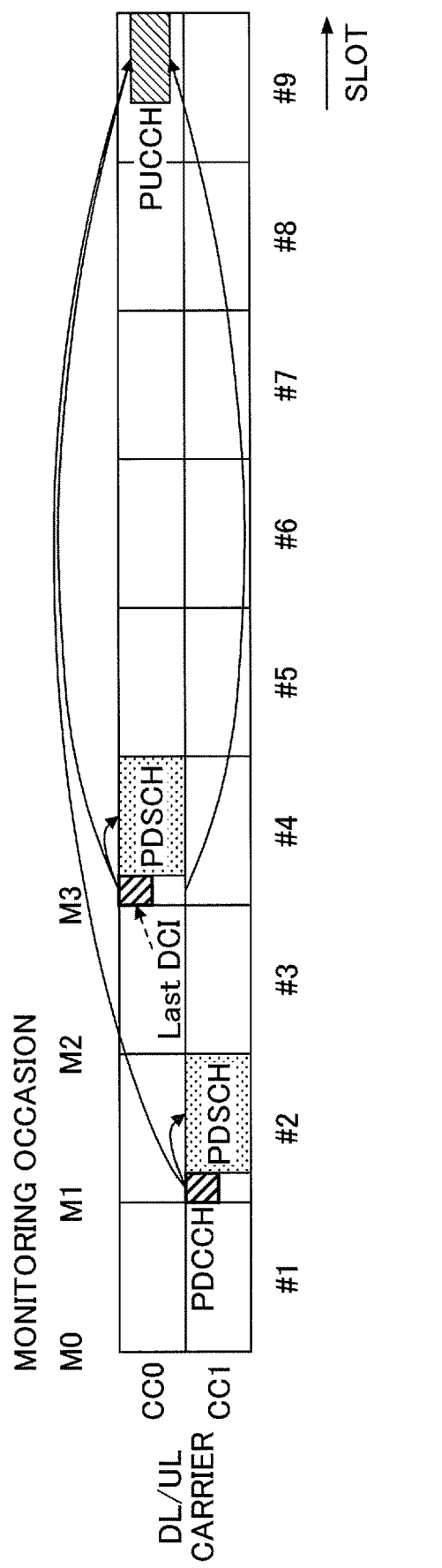
FIG. 13 is a diagram for explaining an example (1) of reporting a multiplexed HARQ response.

FIG. 13 is a diagram for explaining an example (1) of reporting a multiplexed HARQ response. In the NR, the PUCCH resource for transmitting the HARQ-ACK is the PUCCH resource specified by the last DCI among of the DCIs (performing DL assignment) corresponding to the HARQ-ACKs that are multiplexed and transmitted. The last DCI refers to the DCI that is last in the order of the plurality of DCIs defined by the serving cell and the PDCCH monitoring occasion. It is prohibited that a plurality of DL assignments are transmitted to the terminal 20 in one {serving cell, PDCCH monitoring occasion}.

As illustrated in FIG. 13, between the DCI in a CC1 and a monitoring occasion M1 in a slot #2, and the DCI in a CC0 and a monitoring occasion M3 in a slot #4, the DCI in the CC0 and the monitoring occasion M3 is the last DCI, and this DCI indicates the PUCCH resource for transmitting the HARQ-ACK of a slot #9. In the PUCCH of the slot #9, the HARQ-ACK in response to the PDSCH reception in the slot #2, and the HARQ-ACK in response to the PDSCH reception in the slot #4, are multiplexed and transmitted.

Figure 14:
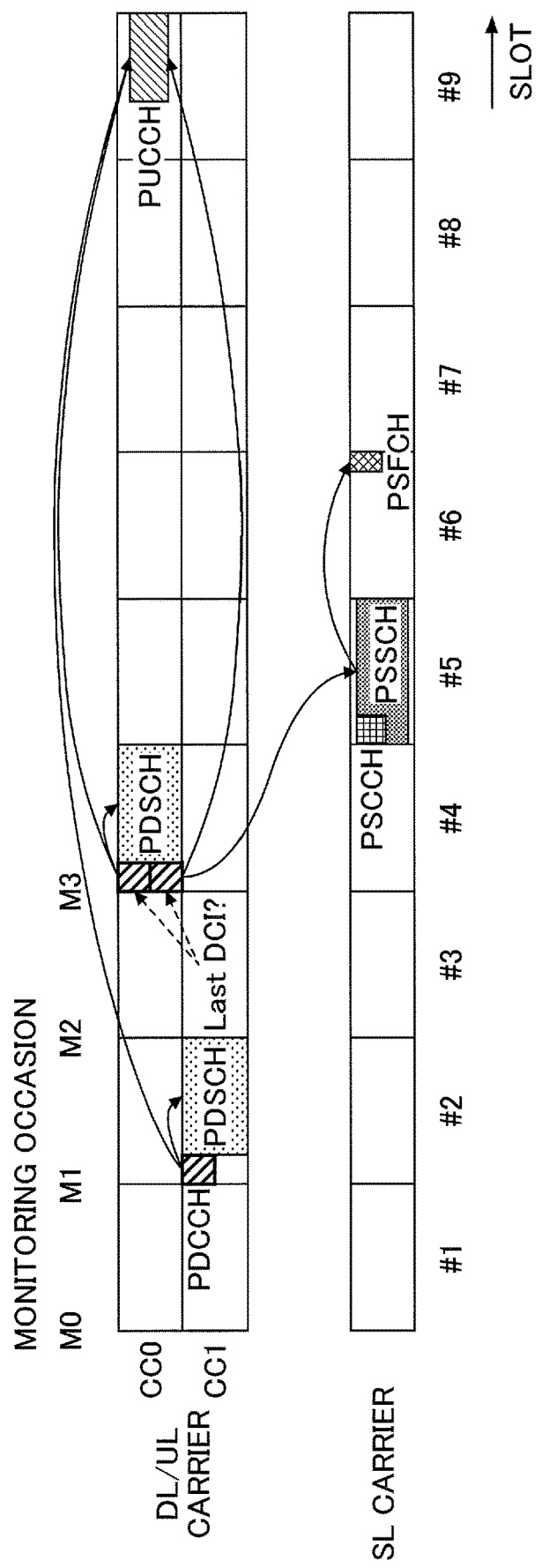
FIG. 14 is a diagram for explaining an example (2) of reporting the multiplexed HARQ response.

FIG. 14 is a diagram for explaining an example (2) of reporting the multiplexed HARQ response. In the NR, the PUCCH resource for transmitting HARQ-ACK is the PUCCH resource specified by the last DCI, among the DCIs (performing DL assignment or SL assignment) corresponding to the HARQ-ACKs that are multiplexed and transmitted.

Here, a case may be assumed in which the DL assignment and the SL assignment are transmitted in one {serving cell, PDCCH monitoring occasion}. As illustrated in FIG. 14, the DL assignment by the DCI, and the SL assignment by the DCI, are generated in the CC0 and the monitoring occasion M3 in the slot #4. That is, in one {serving cell, PDCCH monitoring occasion}, the DL assignment and the SL assignment are generated, and the order of the DCI cannot be determined. Therefore, it is not possible to determine the PUCCH resource to transmit the multiplexed HARQ-ACK.

Hence, when multiplexing and transmitting a SL-HARQ-ACK and a DL-HARQ-ACK by a certain PUCCH resource, this PUCCH resource may be determined based on the indication of the "last DCI" that is determined based on a specific rule, among the corresponding plurality of DCIs.

The DCI for the SL scheduling (hereinafter referred to as "SL-DCI") and the DCI for the DL scheduling (hereinafter referred to as "DL-DCI") are not distinguished, and are ordered or indexed according to the serving cell and the PDCCH monitoring occasion. In addition, when both the SL-DCI and the DL-DCI are transmitted in the last {serving cell, PDCCH monitoring occasion} in which the DCI is transmitted, the following operations 1)-3) may be performed.

1) The DL-DCI is regarded as the last DCI. That is, the index is assigned in the order of the SL-DCI and the DL-DCI. The PUCCH resource is determined based on the indication of the DL-DCI.

2) The SL-DCI is regarded as the last DCI. That is, the index is assigned in the order the DL-DCI and the SL-DCI. The PUCCH resource is determined based on the indication of the SL-DCI.

3) The last DCI is determined based on time and/or frequency resource. The last DCI is determined based on the time and/or frequency resource to which the DL-DCI or the SL-DCI that is transmitted.

Further, as another ordering method, the order or index may be assigned between the SL-DCI and the DL-DCI. In this case, 3 elements which are the ordering or indexing by the serving cell, and the ordering or indexing by the PDCCH monitoring occasion, may be applied in any order. That is, the ordering may be first made between the SL-DCI and the DL-DCI in the same serving cell and the PDCCH monitoring occasion, the ordering may then made by the serving cell in the same PDCCH monitoring occasion, and the ordering may be finally made by the PDCCH monitoring occasion, or alternatively, other ordering may be made.

In addition, as yet another ordering method, the serving cell and the PDCCH monitoring occasion may be ordered for each of the SL-DCI and the DL-DCI, and the PUCCH resource may be determined thereafter based on either the last SL-DCI or the last DL-DCI.

As described above, when multiplexing and transmitting the SL-HARQ-ACK and the DL-HARQ-ACK in a certain PUCCH resource, the "last DCI" can be determined by determining this PUCCH resource based on the indication of the "last DCI" that is determined based on the specific rule, among the corresponding plurality of DCIs, and it is possible to identify the PUCCH resource to which the multiplexed HARQ-ACK is transmitted.

Figure 15:
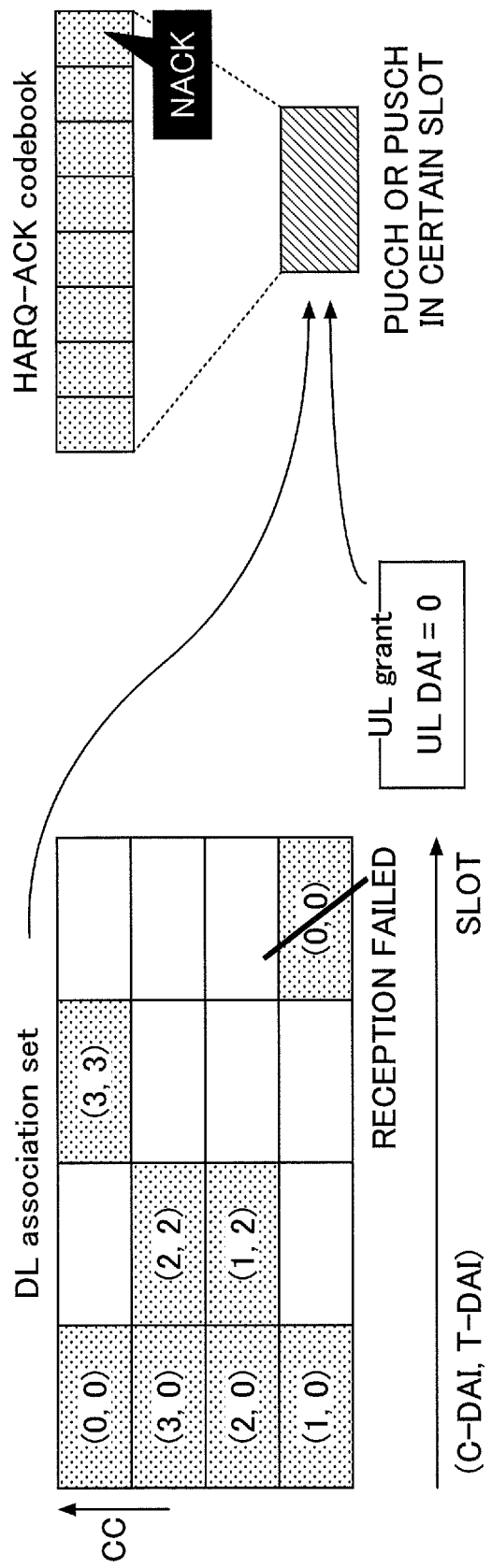
FIG. 15 is a diagram for explaining an example (3) of reporting the multiplexed HARQ response.

FIG. 15 is a diagram for explaining an example (3) of reporting the multiplexed HARQ response. When the PUCCH including the HARQ-ACK collides with the PUSCH, the HARQ-ACK may be multiplexed to the PUSCH (in some cases, the PUSCH may be dropped when the PUCCH including the HARQ-ACK collides with the PUSCH). A DAI (Downlink Assignment Indicator) is transmitted in the DCI that schedules the PUSCH, and a number of HARQ-ACKs to be multiplexed to the PUSCH is indicated, based on the value of DAI. The DAI in the DCI for scheduling the PUSCH is referred to as a UL-DAI. The DAI in the DCI for scheduling the PDSCH is referred to as a C-DAI (counter DAI) and/or a T-DAI (total DAI). The DAI can avoid mismatches in HARQ-ACK bits, even when an erroneous detection of the PDCCH occurs. Hereinafter, the C-DAI, the UL-DAI, and the T-DAI are assumed to have values starting from 0 and defined by a remainder of 4, but this definition is merely an example, and the DAI may be defined in other ways.

FIG. 15 illustrates an example in which the reception of the PDCCH, that becomes (C-DAI, T-DAI)=(0, 0) at the fourth slot in a DL association set (DL association set), fails. Since the HARQ-ACKs that are multiplexed are the 8 corresponding to (C-DAI, T-DAI) that are (1,0), (2,0), (3,0), (0,0), (1,2), (2,2), (3,3), and (0,0), the UL-DAI becomes 8mod4=0. That is, as illustrated in FIG. 15, the value of the UL-DAI included in the DCI that assigns the PUSCH becomes 0. Because UL-DAI=0, and differs from the value (=3) of the UL-DAI expected from (C-DAI, T-DAI)=(3, 3) in the last DCI that is received, it may be found that the terminal 20 failed to receive the PDCCH from and after the last DCI. That is, the terminal 20 can recognize that the number of bits of the HARQ-ACK codebook is 8, despite receiving 7 PDCCHs due to failing to receive the PDCCH.

Figure 16:
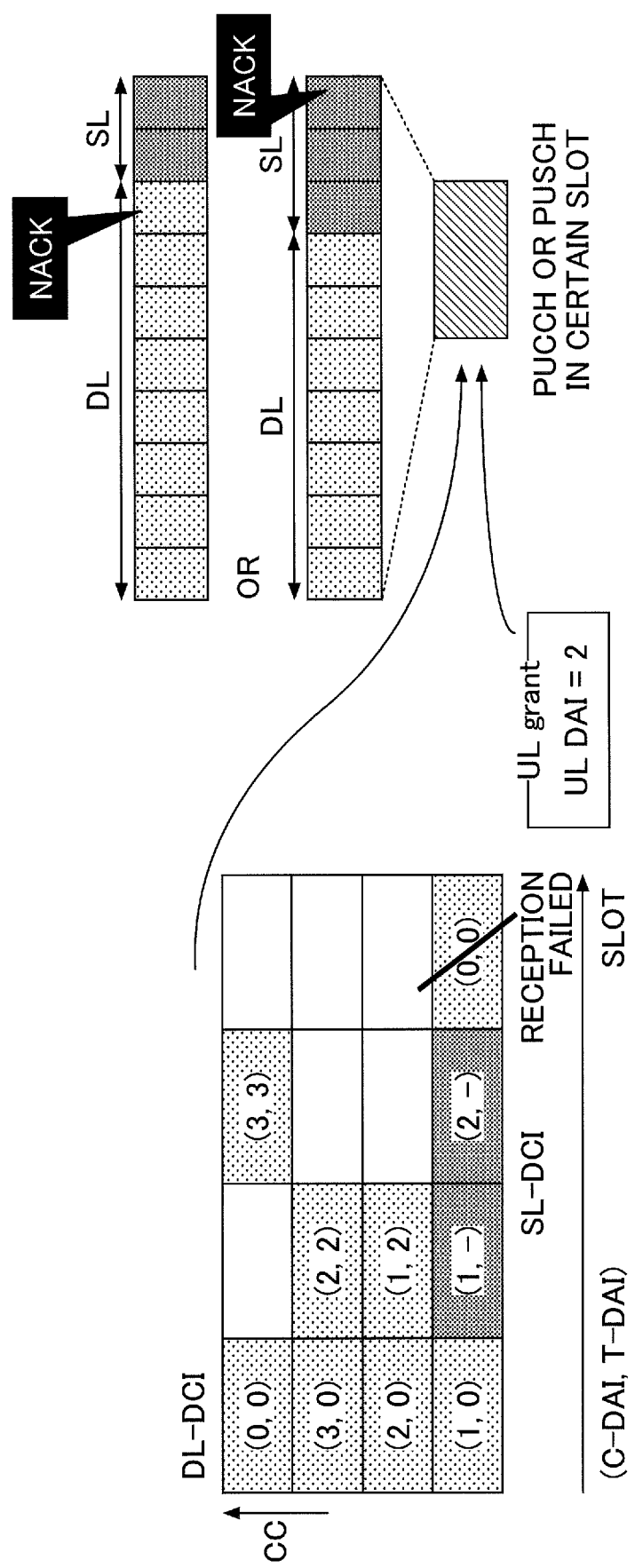
FIG. 16 is a diagram for explaining an example (4) of reporting the multiplexed HARQ response.

FIG. 16 is a diagram for explaining an example (4) of reporting the multiplexed HARQ response. The HARQ-ACK codebooks, separately generated for the DL the SL, may thereafter be combined. That is, the SL-DCI and the DL-DCI may be counted or managed separately. When the PUCCH including the SL-HARQ-ACK and the DL-HARQ-ACK, collides with the PUSCH, the terminal 20 transmits the HARQ-ACK multiplexed to the PUSCH. In some cases, the PUSCH may be dropped.

FIG. 16 illustrates an example in which the reception of the PDCCH, that becomes (C-DAI, T-DAI)=(0, 0) in which the DL-DCI is transmitted in the fourth slot, fails. The HARQ-ACKs that are multiplexed are the 8 corresponding to the DL-DCI (C-DAI, T-DAI) that are (1,0), (2,0), (3,0), (0,0), (1,2), (2,2), (3,3), and (0), and the SL-DCIs are the 2 corresponding to (1,–) and (2,–). FIG. 16 is an example in which the T-DAI is not defined in the SL. The T-DAI may also be transmitted in the SL-DCI.

When the UL-DAI is defined without distinguishing between the SL-DCI and the DL-DCI, a total of 10 DCIs are transmitted, and thus, the UL-DAI becomes 10mod4=2. That is, as illustrated in FIG. 16, the value of the UL-DAI included in the DCI that assigns the PUSCH is 2. Since UL-DAI=2, the terminal 20 can recognize that the number of bits of the HARQ-ACK codebook is 10 bits, despite receiving 9 PDCCHs. However, because it is unknown whether the reception of the SL-DCI or the reception of the DL-DCI failed, it is not possible to determine whether the HARQ-ACK codebook includes an 8-bit DL and a 2-bit SL, or the HARQ-ACK codebook includes a 7-bit DL and a 3-bit SL, as illustrated in FIG. 16. That is, the size of the DL HARQ-ACK codebook or the size of the SL HARQ-ACK codebook is unknown.

Thus, the UL-DAI in the DCI for scheduling the PUSCH, that collides with the PUCCH including the SL-HARQ-ACK and the DL-HARQ-ACK, may be determined based on a specific DCI. For example, the UL-DAI may be determined based on the DCI according to the following a)-d).

a) The UL-DAI may be determined based on the number of DCIs or PDCCHs corresponding to the SL-HARQ-ACK and the DL-HARQ-ACK. In the example illustrated in FIG. 16, since the number of PDCCHs corresponding to the SL-HARQ-ACK and the DL-HARQ-ACK is 10, the UL-DAI becomes 10mod2=2. The number of bits of the SL-HARQ-ACK may be determined based on the value of this UL-DAI and the number of bits expected from the received SL-DCI. In addition, the number of bits of the DL-HARQ-ACK may be determined based on the value of this UL-DAI and the number of bits expected from the received DL-DCI. That is, since 2 bits of SL-HARQ-ACK are expected from the SL-DCI, and 2mod4=2, whereas the received UL-DAI is 2, the number of bits of the SL-HARQ-ACK is set to 2. Further, since the number of bits of the DL-HARQ-ACK is expected to be 7 from the DL-DCI, and 7mod4=3, whereas the received UL-DAI is 2, the number of bits of the DL-HARQ-ACK is set to 8 bits.

b) The UL-DAI may be determined based on the number of DCIs or PDCCHs corresponding to the SL-HARQ-ACK. In the example illustrated in FIG. 16, since the number of PDCCHs corresponding to the SL-HARQ-ACK is 2, the UL-DAI becomes 2mod4=2. The number of bits of the SL-HARQ-ACK is determined based on the value of this UL-DAI. The number of bits of the DL-HARQ-ACK may be determined based on the value of this UL-DAI, or not based on the value of this UL-DAI.

c) The UL-DAI may be determined based on the number of DCIs or PDCCHs corresponding to the DL-HARQ-ACK. In the example illustrated in FIG. 16, since the number of the PDCCHs corresponding to the SL-HARQ-ACK is 2, the UL-DAI becomes 8mod4=0. The number of bits of the DL-HARQ-ACK is determined based on the value of this UL-DAI. The number of bits of the SL-HARQ-ACK may be determined based on the value of this UL-DAI, or not based on the value of this UL-DAI.

d) In the DCI that schedules the PUSCH, 2 UL-DAIs, namely, the UL-DAI determined based on the number of DCIs or PDCCHs corresponding to the SL-HARQ-ACK, and the UL-DAI determined based on the number of DCIs or PDCCHs corresponding to the DL-HARQ-ACK, may be transmitted. The first UL-DAI may be the UL-DAI determined based on the number of DCIs or PDCCHs corresponding to the SL-HARQ-ACK and the DL-HARQ-ACK, and the second UL-DAI may be the UL-DAI determined based on the number of DCIs or PDCCHs corresponding to the SL-HARQ-ACK or the DL-HARQ-ACK.

By defining the UL-DAI in the above manner, when the SL-HARQ-ACK and the DL-HARQ-ACK are multiplexed and transmitted by the PUSCH, the number of bits of the HARQ-ACK codebook can be specified by the UL-DAI.

In addition, when the SL resource is scheduled by a configured grant (configured grant) or a dynamic grant (dynamic grant), and when no data to be transmitted exists, an operation related to the HARQ response to base station 10 needs to be defined.

In the resource corresponding to the UL grant, the terminal 20 may skip the transmission when no data to be transmitted exists. On the other hand, even in the resources corresponding to the SL grant, it is assumed that the terminal 20 is able to skip the data transmission when no data to be transmitted exists, and the PSCCH/PSSCH is not transmitted and the PSFCH is not received. However, when the HARQ-ACK response is requested/configured/indicated, it is necessary to define how the HARQ-ACK report is to be processed.

Thus, when the resource is provided from the base station 10 by the configured or dynamic grant, and the TB (Transport block) to be transmitted in the resource is not received from the higher layer, that is, when there is no TB to be transmitted, the terminal 20 may determine the operation related to the HARQ response to the base station 10 corresponding to the resource based on specific conditions.

Figure 17:
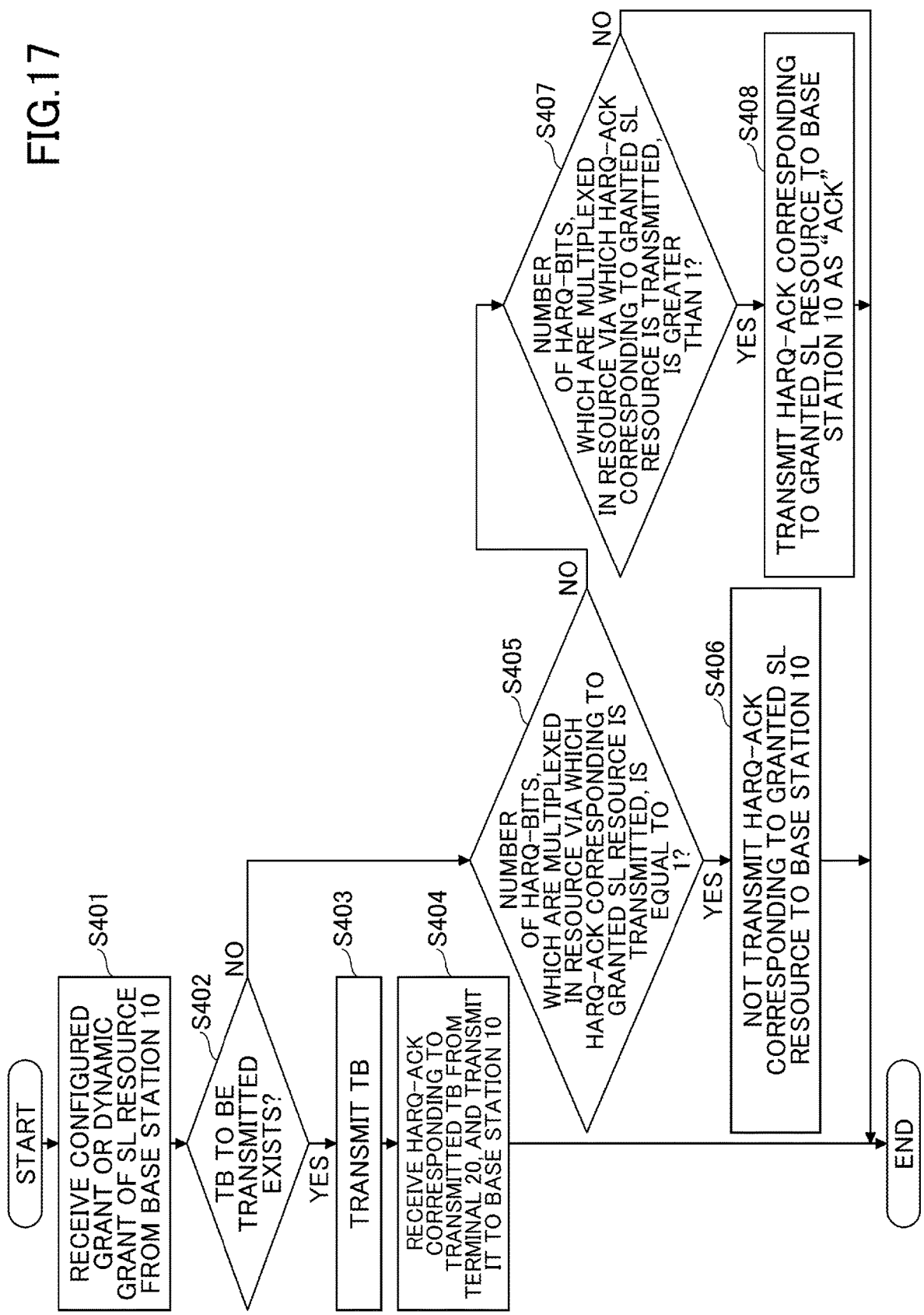
FIG. 17 is a flowchart for explaining an example (1) of a process related to a HARQ response according to one embodiment of the present invention.

FIG. 17 is a flowchart for explaining an example (1) of a process according to the HARQ response according to one embodiment of the present invention. FIG. 17 is an example of determining the operation related to the HARQ response based on the number of bits of the HARQ-ACKs multiplexed and transmitted in the same resource. The number of HARQ-ACK bits may be alternatively referred to as the number of UCI bits.

In step S401, the terminal 20 receives the configured grant or the dynamic grant of the SL resource from the base station 10. Subsequently, the terminal 20 determines whether there is a TB to be transmitted (S402). When there is a TB to be transmitted (YES in S402), the process proceeds to step S403, and when there is no TB to be transmitted (NO in S402), the process proceeds to step S405.

In step S403, the terminal 20 transmits the TB. Subsequently, the HARQ-ACK corresponding to the transmitted TB is received from another terminal 20, and further transmitted to the base station 10 (S404).

On the other hand, in step S405, the terminal 20 determines whether the number of HARQ-ACK bits that is multiplexed is 1 in the resource to which the HARQ-ACK corresponding to the granted SL resource is transmitted. When the number of HARQ-ACK bits is 1 (YES in S405), the process proceeds to step S406, and when the number of HARQ-ACK bits is not 1 (NO in S405), the process proceeds to step S407.

In step S406, the terminal 20 does not transmit the HARQ-ACK corresponding to the granted SL resource to the base station 10. On the other hand, in step S407, the terminal 20 determines whether the number of HARQ-ACK bits multiplexed in the resource to which the HARQ-ACK corresponding to the granted SL resource is transmitted exceeds 1. When the number of HARQ-ACK bits exceeds 1 (YES in S407), the process proceeds to step S408, and when the number of HARQ-ACK bits does not exceed 1 (NO in S407), the flow ends. In step S408, the terminal 20 transmits the HARQ-ACK corresponding to the granted SL resource as an "ACK" to the base station 10.

Figure 18:
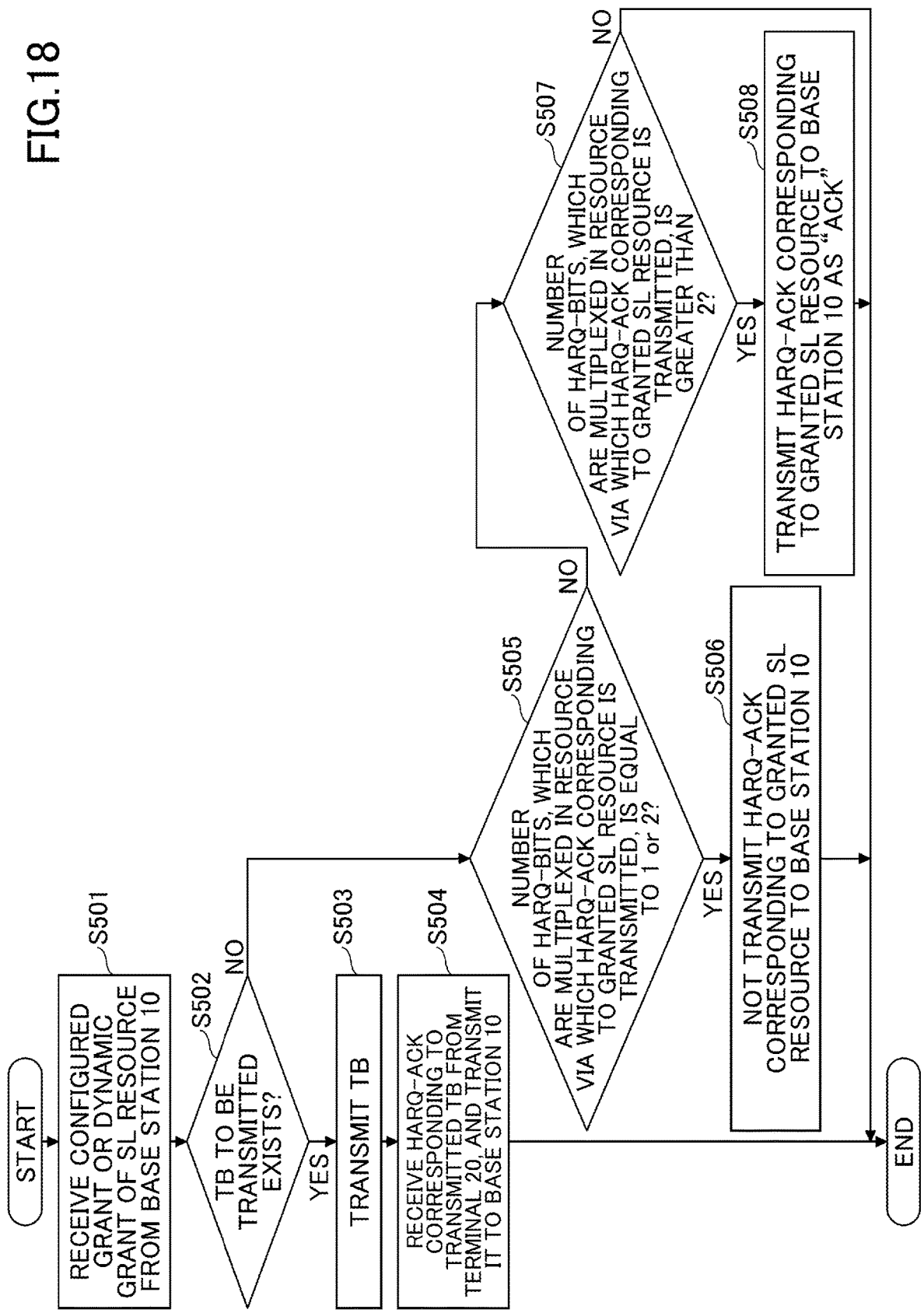
FIG. 18 is a flowchart for explaining an example (2) of the process related to the HARQ response according to one embodiment of the present invention.

FIG. 18 is a flowchart for explaining an example (2) of the process according to the HARQ response according to one embodiment of the present invention. FIG. 18 is another example of determining the operation related to the HARQ response based on the number of bits of the HARQ-ACK multiplexed and transmitted in the same resource.

In step S501, the terminal 20 receives the configured grant or the dynamic grant of the SL resource from the base station 10. Subsequently, the terminal 20 determines whether or not there is a TB to be transmitted (S502). When there is a TB to be transmitted (YES in S502), the process proceeds to step S503, and when there is no TB to be transmitted (NO in S502), the process proceeds to step S405.

In step S503, the terminal 20 transmits the TB. Subsequently, the HARQ-ACK corresponding to the transmitted TB is received from another terminal 20, and further transmitted to the base station 10 (S504).

On the other hand, in step S505, the terminal 20 determines whether or not the number of HARQ-ACK bits multiplexed is 1 or 2 in the resource to which the HARQ-ACK corresponding to the granted SL resource is transmitted. When the number of HARQ-ACK bits is 1 or 2 (YES in S505), the process proceeds to step S506, and when the number of HARQ-ACK bits is not 1 or 2 (NO in S505), the process proceeds to step S507.

In step S506, the terminal 20 does not transmit the HARQ-ACK corresponding to the granted SL resource to the base station 10. On the other hand, in step S507, the terminal 20 determines whether or not the number of HARQ-ACK bits multiplexed in the resource to which the HARQ-ACK corresponding to the granted SL resource is transmitted exceeds 2. When the number of HARQ-ACK bits exceeds 2 (YES in S507), the process proceeds to step S508, and when the number of HARQ-ACK bits does not exceed 2 (NO in S507), the flow ends. In step S508, the terminal 20 transmits the HARQ-ACK corresponding to the granted SL resource as an "ACK" to the base station 10.

Figure 19:
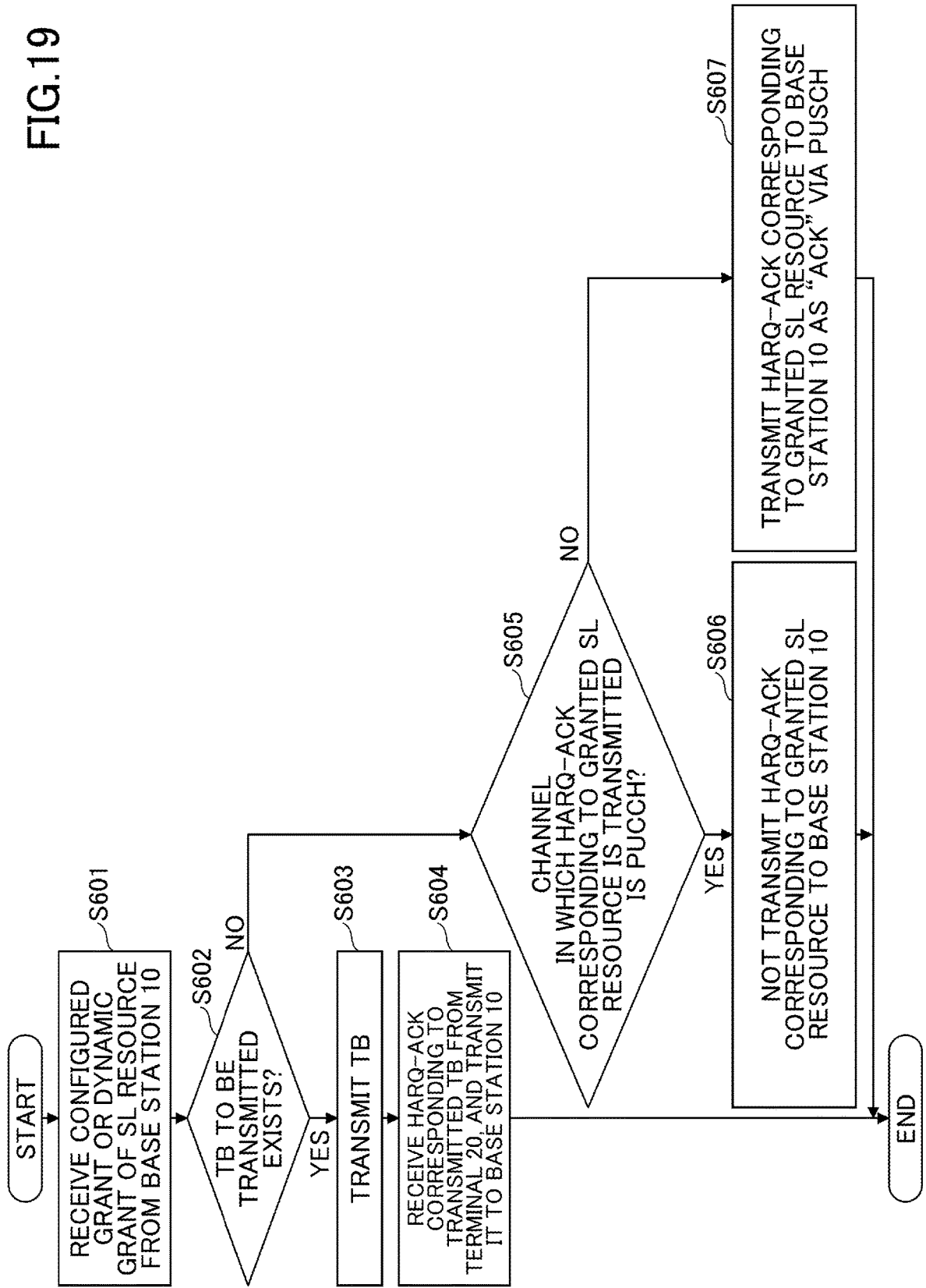
FIG. 19 is a flowchart for explaining an example (3) of the process related to the HARQ response according to one embodiment of the present invention.

FIG. 19 is a flowchart for explaining an example (3) of the process according to the HARQ response according to one embodiment of the present invention. FIG. 19 is an example of determining the operation related to the HARQ response based on the transmitted channel.

In step S601, the terminal 20 receives the configured grant or the dynamic grant of the SL resource from the base station 10. Subsequently, the terminal 20 determines whether or not there is a TB to be transmitted (S602). When there is a TB to be transmitted (YES in S602), the process proceeds to step S603, and when there is no TB to be transmitted (NO in S602), the process proceeds to step S605.

In step S603, the terminal 20 transmits the TB. Subsequently, the HARQ-ACK corresponding to the transmitted TB is received from another terminal 20, and further transmitted to the base station 10 (S604).

On the other hand, in step S605, the terminal 20 determines whether or not the channel in which the HARQ-ACK corresponding to the granted SL resource is transmitted is PUCCH. When the channel in which the HARQ-ACK is transmitted is PUCCH (YES in S605), the process proceeds to step S606, and when the channel in which the HARQ-ACK is transmitted is not PUCCH (NO in S605), the process proceeds to step S607. When the channel in which the HARQ-ACK is transmitted is PUSCH, the process may proceed to step S607.

In step S606, the terminal 20 does not transmit the HARQ-ACK corresponding to the granted SL resource to the base station 10. On the other hand, in step S607, the terminal 20 transmits the HARQ-ACK corresponding to the granted SL resource as an "ACK" to the base station 10 via the PUSCH.

Figure 20:
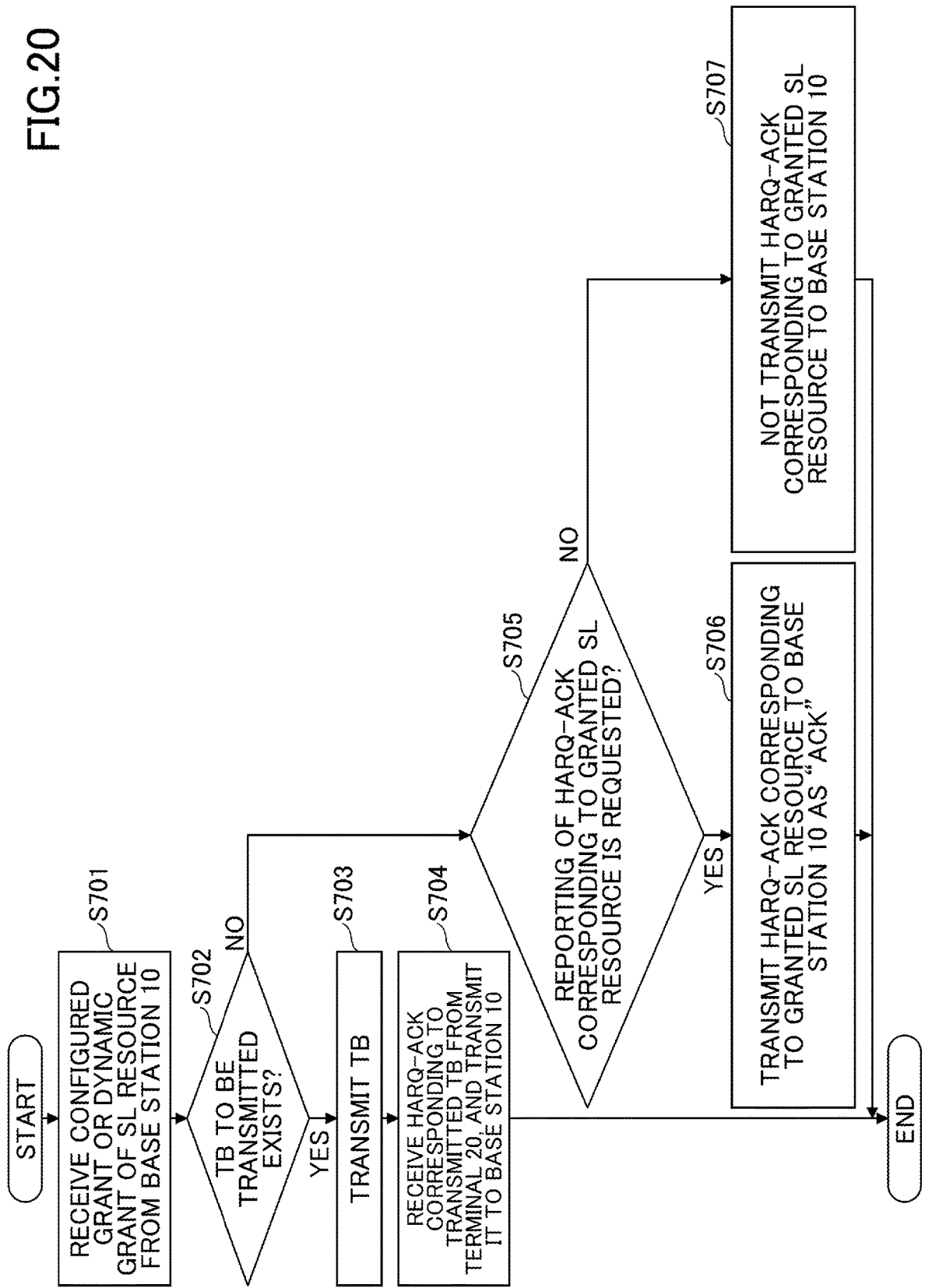
FIG. 20 is a flowchart for explaining an example (4) of the process related to the HARQ response according to one embodiment of the present invention.

FIG. 20 is a flowchart for explaining an example (4) of the process according to the HARQ response according to one embodiment of the present invention. FIG. 20 is an example of determining the operation related to the HARQ response based on whether a HARQ-ACK report is required.

In step S701, the terminal 20 receives the configured grant or the dynamic grant of the SL resource from the base station 10. Subsequently, the terminal 20 determines whether or not there is a TB to be transmitted (S702). When there is a TB to be transmitted (YES in S702), the process proceeds to step S703, and when there is no TB to be transmitted (NO in S702), the process proceeds to step S705.

In step S703, the terminal 20 transmits the TB. Subsequently, the HARQ-ACK corresponding to the transmitted TB is received from another terminal 20, and may or may not be further transmitted to the base station 10 (S704).

On the other hand, in step S705, the terminal 20 determines whether or not the reporting of the HARQ-ACK corresponding to the granted SL resource is requested. When the HARQ-ACK report is requested (YES of S705), the process proceeds to step S706, and when no HARQ-ACK report is required (NO in S705), the process proceeds to step S707.

In step S706, the terminal 20 transmits the HARQ-ACK corresponding to the granted SL resource as an "ACK" to the base station 10. On the other hand, in step S707, the terminal 20 does not transmit the HARQ-ACK corresponding to the granted SL resource to the base station 10.

As described above, the operation related to the processing of the HARQ-ACK to be reported to the base station 10 when the transmitted TB does not exist can be clarified.

According to the above embodiments, the terminal 20 can clarify the operation for the process related to the HARQ-ACK to be reported to the base station 10, when the TB to be transmitted is not present in the granted resource.

That is, it is possible to determine the process related to the HARQ (Hybrid Automatic Repeat Request) feedback, when the TB (Transport block) to be transmitted is not present in the granted resource.

(Device Configuration)

Next, a functional configuration example of the base station 10 and the terminal 20 for performing the processes and operations described above will be described. The base station 10 and terminal 20 include functions for implementing the embodiments described above. However, each of the base station 10 and the terminal 20 may configured to include only a part of the functions of the embodiments.

<Base Station 10>

Figure 21:
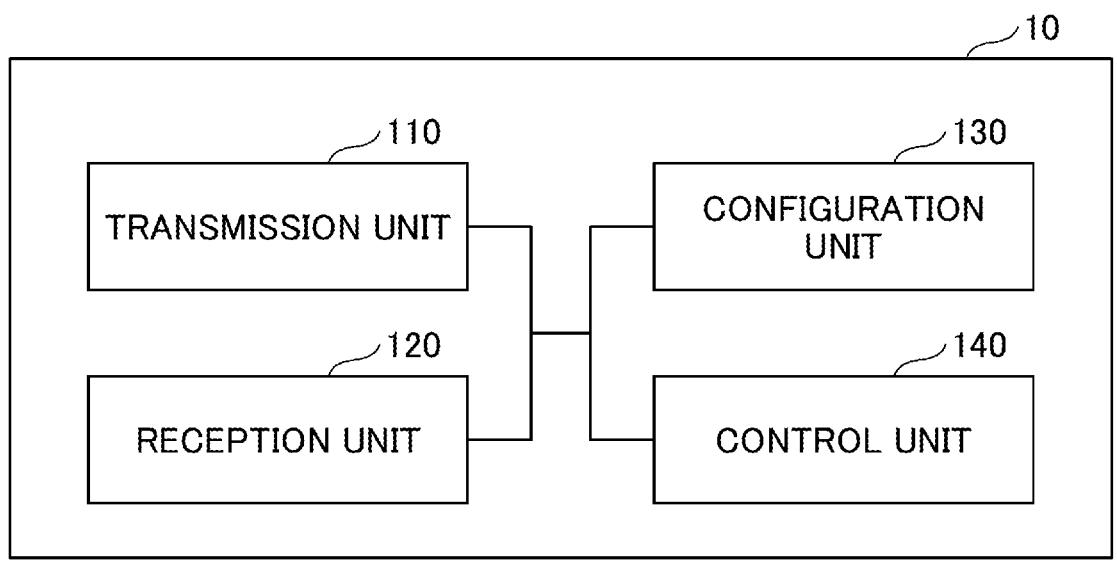
FIG. 21 is a diagram illustrating an example of a functional configuration of a base station 10 according to one embodiment of the present invention.

FIG. 21 is a diagram illustrating an example of a functional configuration of the base station 10. As illustrated in FIG. 21, the base station 10 includes a transmission unit 110, a reception unit 120, a configuration unit 130, and a control unit 140. The functional configuration illustrated in FIG. 21 is merely one example. As long as the operation according to the embodiments of the present invention can be performed, the functional categorizations and the name of the functional parts may be arbitrarily selected.

The transmission unit 110 includes functions for generating a signal to be transmitted to the terminal 20 side, and performing a wireless transmission of the signal. The reception unit 120 includes functions for receiving various signals transmitted from the terminal 20, and acquiring, for example, information of a higher layer from the received signals. In addition, the transmission unit 110 includes functions to transmit the NR-PSS, NR-SSS, NR-PBCH, DL/UL control signal, DL reference signal, or the like to the terminal 20.

The configuration unit 130 stores the preset setting information and various setting information to be transmitted to the terminal 20 in the storage device, and reads the preset setting information from the storage device, as appropriate. The contents of the setting information are, for example, information related to the setting of the D2D communication.

As described in the embodiments, the control unit 140 performs the process related to the setting for the terminal 20 to perform the D2D communication. In addition, the control unit 140 transmits scheduling of the D2D communication and the DL communication to the terminal 20 through the transmission unit 110. Moreover, the control unit 140 receives information related to the HARQ response of the D2D communication and the DL communication from the terminal 20 via the reception unit 120. A functional part related to the signal transmission in the control unit 140 may be included in the transmission unit 110, and a functional part related to the signal reception in the control unit 140 may be included in the reception unit 120.

<Terminal 20>

Figure 22:
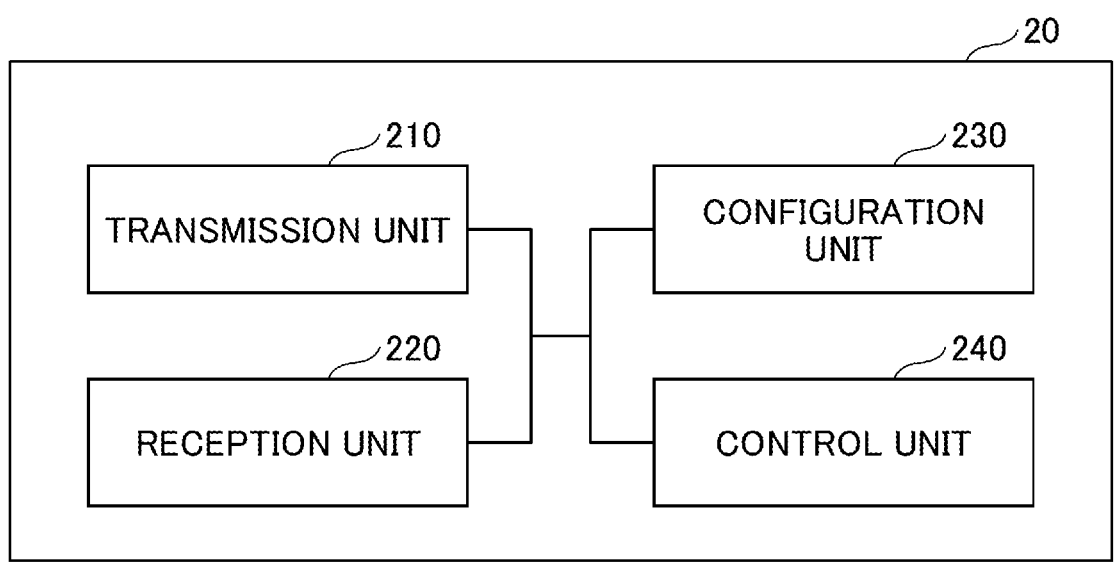
FIG. 22 is a diagram illustrating an example of a functional configuration of a terminal 20 according to one embodiment of the present invention.

FIG. 22 is a diagram illustrating an example of a functional configuration of the terminal 20. As illustrated in FIG. 22, the terminal 20 includes a transmission unit 210, a reception unit 220, a configuration unit 230, and a control unit 240. The functional configuration illustrated in FIG. 22 is merely one example. As long as the operation according to the embodiments of the present invention can be performed, the functional categorizations and the name of the functional parts may be arbitrarily selected.

The transmission unit 210 creates a transmission signal from the transmission data, and performs a wireless transmission of the transmission signal. The reception unit 220 performs a wireless reception of various signals, and acquires signals of higher layers from the received signals of the physical layers. The reception unit 220 includes functions to receive the NR-PSS, NR-SSS, NR-PBCH, and DL/UL/SL control signals or reference signals transmitted from the base station 10. In addition, the transmission unit 210 transmits the PSCCH (Physical Sidelink Control Channel), PSSCH (Physical Sidelink Shared Channel), PSDCH (Physical Sidelink Discovery Channel), PSBCH (Physical Sidelink Broadcast Channel), or the like, for example, to the other terminal 20 as the D2D communication, and the reception unit 220 receives the PSCCH, PSSCH, PSDCH, PSDCH, or the like from the other terminal 20.

The configuration unit 230 stores various setting information received from the base station 10 or the terminal 20 by the reception unit 220 in the storage device, and reads the stored setting information from the storage device, as appropriate. The configuration unit 230 also stores the preset setting information. The contents of the setting information are, for example, information related to the setting of the D2D communication.

The control unit 240 controls the D2D communication with the other terminal 20 as described in the embodiments. In addition, the control unit 240 performs a processing related to the HARQ of the D2D communication and the DL communication. Moreover, the control unit 240 transmits information related to the HARQ response of the D2D communication and the DL communication to the other terminal 20 scheduled from the base station 10. Further, the control unit 240 may schedule the D2D communication to the other terminal 20. In addition, the control unit 240 may autonomously select the resources used for the D2D communication from a resource selection window. The control unit 240 also performs a processing related to the MCS in the transmission and the reception of the D2D communication. A functional part related to the signal transmission in the control unit 240 may be included in the transmission unit 210, and a functional part related to signal reception in the control unit 240 may be included in the reception unit 220.

(Hardware Configuration)

Block diagrams (FIG. 21 and FIG. 22) used in the description of the above embodiments illustrate the blocks in units of functionals. These functional blocks (functional parts) may be implemented by an arbitrary combination of at least one of hardware and software. In addition, the implementation method of each of the functional blocks is not particularly limited. In other words, each functional block may be implemented using a single device that is physically or logically integrated, or using two or more devices that are physically or logically separated and directly or indirectly connected (for example, using cable, wireless, or the like). The functional block may be implemented by a combination of software and the single device or the plurality of devices described above.

The functions include, but are not limited to, judgment, determination, determination, calculation, computation, processing, derivation, research, search, verification, reception, transmission, output, access, resolution, selection, selection, establishment, comparison, assumption, expectation, deeming, broadcasting (broadcasting), notifying (notifying), communicating (communicating), forwarding (forwarding), configuring (configuring), reconfiguring (reconfiguring), allocating (allocating, mapping), and assigning (assigning). For example, a functional block (functional part) that functions to cause a transmission is called a transmitting unit (transmitting unit) or a transmission unit (transmitter). In either case, as described above, the realization method is not particularly limited.

Figure 23:
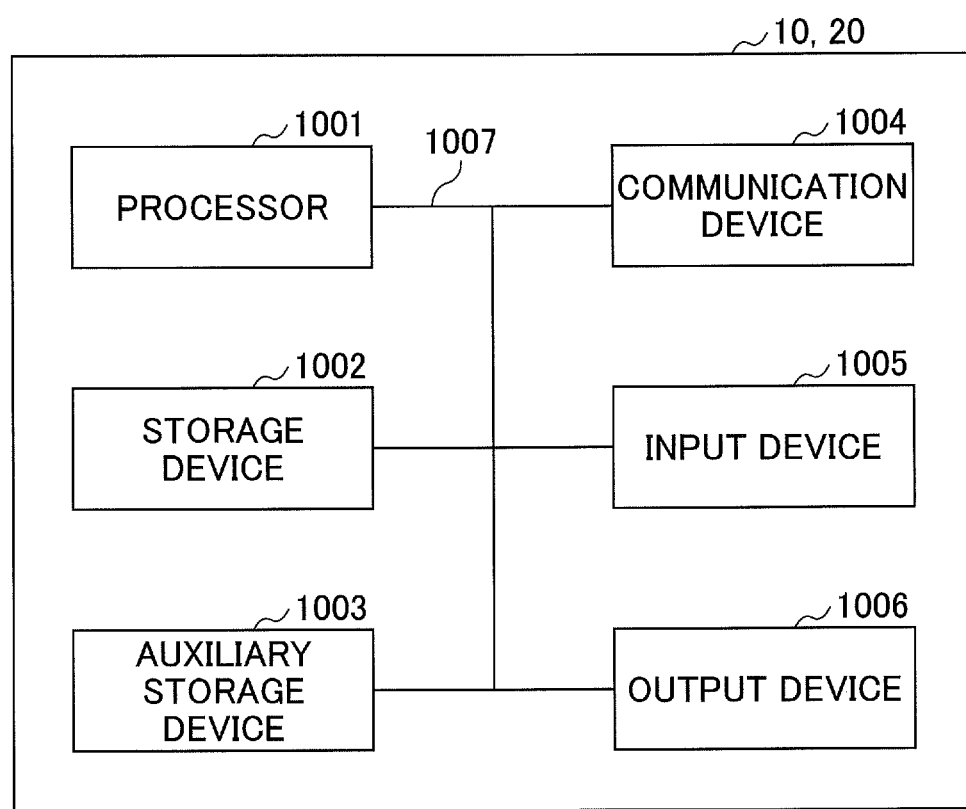
FIG. 23 is a diagram illustrating an example of the hardware configuration of the base station 10 or the terminal 20 according to one embodiment of the present invention.

For example, the base station 10, the terminal 20, or the like according to one embodiment of the present disclosure may function as a computer for processing the wireless communication method of the present disclosure. FIG. 23 is a diagram illustrating an example of the hardware configuration of the base station 10 and the terminal 20 according to one embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, or the like.

In the following description, the term "device" may alternatively referred to as a circuit, a device, a unit, or the like. The hardware configuration of the base station 10 and terminal 20 may be configured to include one or a plurality of the devices illustrated in the figures, or may be configured not to include a part of the devices.

Each function of the base station 10 and the terminal 20 may be realized by reading predetermined software (program) to hardware such as the processor 1001 and the storage device 1002, and performing an operation by the processor 1001, to control the communication by the communication device 1004, or to control at least one of reading and writing of data in the storage device 1002 and the auxiliary storage device 1003.

The processor 1001 operates an operating system, for example, to control the entire computer. The processor 1001 may be formed by a central processing unit (CPU: Central Processing Unit) including an interface with peripheral devices, a controller, an arithmetic unit, a register, or the like. For example, the above-described control unit 140, control unit 240, or the like may be realized by the processor 1001.

In addition, the processor 1001 reads a program (program codes), a software module, data, or the like from at least one of the auxiliary storage device 1003 and the communication device 1004, to the storage device 1002, and performs various processings in accordance with the read information. As the program, a program that causes a computer to execute at least a part of the operation described in the above embodiments, is used. For example, the control unit 140 of the base station 10 illustrated in FIG. 21 may be realized by a control program that is stored in the storage device 1002 and runs on the processor 1001. In addition, for example, the control unit 240 of the terminal 20 illustrated in FIG. 22 may be realized by a control program that is stored in the storage device 1002 and runs on the processor 1001. Although the various processes described above are executed by the single processor 1001 in the description given heretofore, the processes may be executed simultaneously or sequentially by two or more processors 1001. The processor 1001 may be implemented in one or more chips. The program may be transmitted from a network via a telecommunication line.

The storage device 1002 is a computer-readable recording medium, and may be formed by at least one of a ROM (Read Only Memory), an EPROM (Erasable Programmable ROM), an EEPROM (Electrically Erasable Programmable ROM), a RAM (Random Access Memory), or the like, for example. The storage device 1002 may be referred to as a register, a cache, a main memory (main storage), or the like. The storage device 1002 can store programs (program codes), software modules, or the like that are executable to implement the communication method according to one embodiment of the present disclosure.

The auxiliary storage device 1003 is a computer-readable recording medium, and may be formed by at least one of an optical disk, such as a CD-ROM (Compact Disc ROM), a hard disk drive, a flexible disk, a magneto-optical disk (for example, a compact disk, a digital versatile disk, a Blu-ray (registered trademark) disk, a smart card, a flash memory (for example, a card, a stick, a keydrive), a floppy disk (registered trademark), a magnetic strip, or the like. The storage medium described above may be, for example, a database, a server, or other suitable medium that includes at least one of the storage device 1002 and the auxiliary storage device 1003.

The communication device 1004 is a hardware (transmitting/receiving device) for performing communication between computers via at least one of a cable network and a wireless network, and is also referred to as a network device, a network controller, a network card, a communication module, or the like, for example. The communication device 1004 may include a high-frequency switch, a duplexer, a filter, a frequency synthesizer, or the like, for example, to implement at least one of a frequency division duplex (FDD: Frequency Division Duplex) and a time division duplex (TDD: Time Division Duplex). For example, an transmitting/receiving antenna, an amplifier part, a transceiver part, a transmission line interface, or the like may be implemented by the communication device 1004. The transmitting part and the receiving part of the transceiver part may be physically or logically separated.

The input device 1005 is an input device (for example, a keyboard, a mouse, a microphone, a switch, a button, a sensor, or the like) that accepts an external input. The output device 1006 is an output device (for example, a display, a speaker, a LED lamp, or the like) that implements an external output. The input device 1005 and the output device 1006 may have an integrated configuration (for example, a touchscreen panel).

Each of the devices, such as the processor 1001, the storage device 1002, or the like, is connected by a bus 1007 for communicating information. The bus 1007 may be formed using a single bus, or may be formed using different buses between the devices.

The base station 10 and the terminal 20 may be formed to also include hardware such as a microprocessor, a digital signal processor (DSP: Digital Signal Processor), an ASIC (Application Specific Integrated Circuit), a PLD (Programmable Logic Device), an FPGA (Field Programmable Gate Array), or the like, and a part or all of the functional blocks may be realized by the hardware. For example, the processor 1001 may be formed using at least one of such hardware.

Summary of Embodiments

As described above, according to one embodiment of the present invention, there is provided a terminal including a reception unit that receives DL (Downlink) control information for allocating a SL (Sidelink) resource, from a base station; a transmission unit that transmits data in the SL resource to another terminal, and transmits a HARQ (Hybrid automatic repeat request) response corresponding to the SL resource or the data to the base station; and a control unit that determines a control related to the HARQ response, based on presence or non-presence of a transport block to be transmitted in the SL resource.

With the above configuration, the terminal 20 can clarify the operation for the process related to the HARQ-ACK to be reported to the base station 10, when the TB to be transmitted is not present in the granted resource. That is, it is possible to determine the process related to the HARQ (Hybrid Automatic Repeat Request) feedback, when the TB (Transport block) to be transmitted is not present in the granted resource.

The control unit may determine the control related to the HARQ response, based on a number of HARQ response bits that are to be multiplexed in a resource for transmitting the HARQ response corresponding to the SL resource or the data, when the transport block to be transmitted in the SL resource is not present. According to this configuration, it is possible to clarify the operation for the process related to the HARQ-ACK to be reported to the base station 10, when the TB to be transmitted is not present in the granted resource.

The control unit may determine the control related to the HARQ response, based on a channel for transmitting the HARQ response corresponding to the SL resource or the data, when the transport block to be transmitted in the SL resource is not present. According to this configuration, it is possible to clarify the operation for the process related to the HARQ-ACK to be reported to the base station 10, when the TB to be transmitted is not present in the granted resource.

The control unit may determine the control related to the HARQ response, based on whether or not the transmission of the HARQ response corresponding to the SL resource or the data is requested, when the transport block to be transmitted in the SL resource is not present. According to this configuration, it is possible to clarify the operation for the process related to the HARQ-ACK to be reported to the base station 10, when the TB to be transmitted is not present in the granted resource.

The control related to the HARQ response may include: not transmitting the HARQ response corresponding to the SL resource or the data to the base station; or transmitting the HARQ response corresponding to the SL resource or the data to the base station as a positive acknowledgement. According to this configuration, it is possible to clarify the operation for the process related to the HARQ-ACK to be reported to the base station 10, when the TB to be transmitted is not present in the granted resource.

In addition, according to one embodiment of the present invention, there is provided a communication method including: receiving DL (Downlink) control information for allocating a SL (Sidelink) resource, from a base station; transmitting data in the SL resource to another terminal, and transmitting a HARQ (Hybrid automatic repeat request) response corresponding to the SL resource or the data to the base station; and determining a control related to the HARQ response, based on presence or non-presence of a transport block to be transmitted in the SL resource.

With the above configuration, the terminal 20 can clarify the operation for the process related to the HARQ-ACK to be reported to the base station 10, when the TB to be transmitted is not present in the granted resource. That is, it is possible to determine the process related to the HARQ (Hybrid Automatic Repeat Request) feedback, when the TB (Transport block) to be transmitted is not present in the granted resource.

Supplement to Embodiments

Thus, although embodiments of the present invention are described, the disclosed invention is not limited to such embodiments, and various modifications, variations, alternatives, substitutions, or the like will be understood by those skilled in the art. Although specific numerical examples are used to facilitate understanding of the invention, unless otherwise indicated, these numerical examples are merely examples and any appropriate value may be used. Classification of items in the above description is not essential to the present invention, and the items described as two or more items may be used in combination as appropriate, or the items described as one item may be applied to the items described in another item (unless a conflict exists). Boundaries of the functional parts or processing parts in the functional block diagrams do not necessarily correspond to boundaries of the physical components. The operation of the plurality of functional parts may be performed by a physically single component, or the operation of one functional part may be performed by physically plurality of components. As for the processing procedures described in the embodiment, the order of the processing may be interchanged unless a conflict exists. For the sake of convenience of describing the processing, the base station 10 and the terminal 20 are described using the functional block diagrams, but such devices may be realized by hardware, software, or a combination thereof. The software operated by the processor of the base station 10 in accordance with the embodiments of the present invention, and the software operated by the processor of the terminal 20 in accordance with the embodiments of the present invention, may be stored in a suitable recording medium such as the random access memory (RAM), the flash memory, the read only memory (ROM), the EPROM, EEPROM, the register, the hard disk (HDD), the removable disk, the CD-ROM, the database, the server, or the like.

In addition, the information indication is not limited to that of the examples/embodiments described in in present disclosure, and other methods may be used. For example, the information indication may be performed by the physical layer signaling (for example, DCI (Downlink Control Information), UCI (Uplink Control Information)), the upper layer signaling (for example, RRC (Radio Resource Control) signaling, MAC (Medium Access Control) signaling, MIB (Master Information Block), SIB (System Information Block)), other signals, or a combination thereof. The RC signaling may also be referred to as an RRC message, and for example, may be a RRC Connection Setup (RRC Connection Setup) message, an RRC connection reconfiguration (RRC Connection Reconfiguration) message, or the like.

Each example/embodiment described in present disclosure may be applied to at least one system using the LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA 2000 UMB (Ultra Mobile Broadband), IEEE 802.11 (Wi-Fi (registered trademark)), IEEE 802.16 (WiMAX (registered trademark)), IEEE 802.20, UWB (Ultra-Wide Band), Bluetooth (registered trademark), and other suitable systems, and a next generation system that is extended based on such systems. In addition, a plurality of systems may be combined (for example, at least one of the LTE and the LTE-A combined with the 5G, or the like) and applied.

The processing procedures, sequences, flowcharts, or the like of each example/embodiment described herein may be reordered, unless a conflict exists. For example, the methods described in the present disclosure are presented using an exemplary ordering to describe elements of the various steps, however, the ordering is not limited to the specific ordering presented.

The specific operations described in this specification as being performed by the base station 10 may be performed by its upper node in some cases. In a network of one or a plurality of network nodes having the base station 10, it will be apparent that various operations performed for the communication with the terminal 20 may be performed by at least one of the base station 10 and network nodes (for example, MME, S-GW, or the like are conceivable, but not limited thereto) other than the base station 10. Although the number of network nodes other than the base station 10 is 1 in the example illustrated above, the other network nodes may be a combination of a plurality of other network nodes (for example, MME and S-GW).

The information, signals, or the like described in present disclosure can be output from a higher layer (or lower layer)

to a lower layer (or higher layer). The information, signals, or the like may also be input and output through a plurality of network nodes.

The input and output information or the like may be stored in a specific location (for example, memory), and managed using a management table. Input and output information or the like may be overwritten, updated, or added. The output information or the like may be deleted. The input information or the like may be transmitted to another device.

The determination in present disclosure may be made according to a value (0 or 1) expressed in 1 bit, by a true or false value (Boolean: true or false), or by a numerical comparison (for example, a comparison with a predetermined value).

The software should be broadly interpreted to mean, whether referred to as software, firmware, middleware, microcode, hardware description language, or by any other name, instructions, sets of instructions, codes, code segments, program codes, programs, subprograms, software modules, applications, software applications, software packages, routines, subroutines, objects, executable files, executable threads, procedures, functions, or the like.

In addition, the software, instructions, information, or the like may also be transmitted and received via a transmission medium. For example, when the software is transmitted from a website, server, or other remote sources using at least one of the cable technology (such as coaxial cable, fiber optic cable, twisted pair, digital subscriber line (DSL: Digital Subscriber Line), or the like) and the wireless technology (infrared, microwave, or the like), at least one of the cable technology and wireless technology is included in the definition of the transmission medium.

The information, signals, or the like described in present disclosure may be represented using any of a variety of different technologies. For example, the data, instructions, commands, information, signals, bits, symbols, chips, or the like, which may be referred to throughout the above description may be represented by voltages, currents, electromagnetic waves, magnetic fields or magnetic particles, optical fields or photons, or any combination thereof.

The terms described in present disclosure and the terms necessary for understanding present disclosure may be replaced by terms having the same or similar meanings. For example, at least one of the channel and the symbol may be a signal (signaling). In addition, the signal may be a message. A component carrier (CC: Component Carrier) may also be referred to as a carrier frequency, cell, frequency carrier, or the like.

The terms "system" and "network" used in the present disclosure are used interchangeably.

Further, the information, parameters, or the like described in the present disclosure may also be expressed using an absolute values, a relative value relative to a predetermined value, or expressed using corresponding other information. For example, the wireless resource may be indicated by an index.

The names used for the parameters described above are not restrictive in any respect. In addition, the mathematical formulas or the like using these parameters may differ from those explicitly disclosed in present disclosure. Since the various channels (for example, PUCCH, PDCCH, or the like) and the information elements may be identified by any suitable name, the various names assigned to these various channels and information elements are not in any way limiting.

In present disclosure, the terms "base station", "base station (BS: Base Station)", "wireless base station", "base station", "fixed station (fixed station)", "NodeB", "eNodeB", "gNodeB (gNB)", "access point (access point)", "transmission point (transmission point)", "reception point (reception point)", "transmission/reception point (transmission/reception point)", "cell", "sector", "cell group", "carrier", "component carrier", or the like may be used interchangeably. The base station in some cases may be referred to by terms such as a macrocell, a small cell, a femtocell, a picocell, or the like.

The base station can accommodate one or a plurality of (for example, 3) cells. When the base station accommodates a plurality of cells, the entire coverage area of the base station can be divided into a plurality of smaller areas, and each smaller area can provide communication services by a base station subsystem (for example, an indoor small base station (RRH: Remote Radio Head). The term "cell" or "sector" refers to a portion or all of the coverage area of at least one of the base station and the base station subsystem that provides the communication services using the coverage.

In present disclosure, terms such as "mobile station (MS: Mobile Station)", "user terminal (user terminal)", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be referred to as a transmitting unit, a receiving unit, a communication device, or the like. At least one of the base station and the mobile station may be a device mounted on a mobile body, a mobile body itself, or the like. The mobile body may be a vehicle (for example, an automobile, an airplane, or the like), an unmanned mobile body (for example, a drone, an autonomous vehicle, or the like), or a robot (manned or unmanned). At least one of the base station and the mobile station includes a device that does not necessarily move during communication operations. For example, at least one of the base station and the mobile station may be an IoT (Internet of Things) device such as a sensor.

In addition, the base station in the present disclosure may be alternatively referred to as a user terminal. For example, various examples/embodiments of the present disclosure may be applied to a configuration in which the communication between the base station and the user terminal is replaced by the communication (for example, may be referred to as D2D (Device-to-Device), V2X (Vehicle-to-Everything), or the like) among a plurality of terminals 20. In this case, the terminal 20 may have the functions of the base station 10 described above. In addition, the terms "upstream" and "downstream" may be alternatively referred to by terms (for example, "side (side)") corresponding to the terminal-to-terminal communication. For example, an upstream channel, a downstream channel, or the like may be alternatively referred to as a side channel.

Similarly, the user terminal in the present disclosure may be alternatively referred to as the base station. In this case, the base station may have the functions of the user terminal described above.

As used in present disclosure, the terms "determining (determining)" and "determining (determining)" may encompass a wide variety of operations. The "determining" and "determining" may include, for example, "determining" and "determining" the judging (judging), calculating (calculating), computing (computing), processing (processing), deriving (deriving), investigating (investigating), looking up (looking up, search, inquiry) (for example, searching in a table, database, or other data structures), ascertaining (ascertaining), or the like. In addition, the "determining" and "determining" may include "determining" and "determining" the receiving (receiving) (for example, receiving information), transmitting (transmitting) (for example, transmitting information), input (input), output (output), accessing (accessing) (for example, accessing data in memory), or the like. Further, the "determining" and "determining" may include "determining" and "determining" resolving (resolving), selecting (selecting), choosing (choosing), establishing (establishing), comparing (comparing), or the like. That is, the "determining" and "determining" may include "determining" and "determining" a certain operation. Moreover, "determining (determining)" may be alternatively referred to as "assuming (assuming)", "expecting (expecting)", "considering (considering)", or the like.

The term "connected (connected)" or "coupled (coupled)" or any variation thereof means any direct or indirect connection or coupling between 2 or more elements, and may include the presence of 1 or more intermediate elements between the 2 elements that are "connected" or "coupled" to each other. The coupling or connection between the elements may be physical, logical, or a combination of thereof. For example, "connected" may be alternatively referred to as "access". As used in the present disclosure, the 2 elements may be regarded as being "connected" or "coupled" to each other using at least one of the one or more wires, cables, and printed electrical connections, and as non-limiting and non-inclusive examples, using the electromagnetic energy having wavelengths in the radio frequency region, the microwave region, and the light (both visible and invisible) region.

The reference signal may be abbreviated as RS (Reference Signal), and may be referred to as a pilot (pilot), depending on the applied standards.

As used in present disclosure, the expression "based on" does not mean "based solely on" unless otherwise indicated. In other words, the expression "based on" means both "based solely on" and "based at least on".

Any reference to an element using a designation such as "first", "second", or the like as used in the present disclosure does not generally limit the amount or order of the elements. These designations may be used in the present disclosure as a convenient way of distinguishing between 2 or more elements. Thus, references to the first and second elements do not imply that only two elements may be employed, or that the first element must in some way precede the second element.

The "means" in the configuration of each of the above devices may be replaced by "part", "circuit", "device", or the like.

When the terms "include (include)", "including (including)" and variations thereof are used in the present disclosure, these terms are intended to be comprehensive and similar to the term "comprising (comprising)". Moreover, the term "or (or)" as used in present disclosure is not intended to be an exclusive logical sum.

The wireless frame may be formed by 1 or more frames in the time domain. 1 or a plurality of frames in the time domain may be referred to as a subframe. The subframe may be further formed by 1 or more slots in the time domain. The subframe may be a fixed length of time (for example, 1 ms) independent of the numerology (numerology).

The numerology may be a communication parameter that is applied to at least one of the transmission and reception of a signal or channel. The numerology may indicate at least one of, for example, subcarrier spacing (SCS: SubCarrier Spacing), bandwidth, symbol length, cyclic prefix length, transmission time interval (TTI: Transmission Time Interval), number of symbols per TTI, wireless frame configuration, a specific filtering process performed by the transceiver part in the frequency domain, and a specific windowing process performed by the transceiver part in the time domain.

The slot may be formed by one or a plurality of symbols (OFDM (Orthogonal Frequency Division Multiplexing) symbols, SC-FDMA (Single Carrier Frequency Division Multiple Access) symbols, or the like) in the time domain. The slot may be in units of time based on the numerology.

The slot may include a plurality of minislots. Each minislot may be formed by 1 or a plurality of symbols in the time domain. The minislot may also be referred to as a subslot. The minislots may be formed by a number of symbols fewer than the slot. The PDSCH (or PUSCH) transmitted in units of time greater than the minislot may be referred to as a PDSCH (or PUSCH) mapping type A. The PDSCH (or PUSCH) transmitted using the minislot may be referred to as a PDSCH (or PUSCH) mapping type B.

The wireless frame, subframe, slot, minislot, and symbol all represent units of time for transmitting the signal. The wireless frame, subframe, slot, minislot, and symbol may respectively be designated by other names.

For example, 1 subframe may be referred to as a transmission time interval (TTI: Transmission Time Interval), a plurality of consecutive subframes may be referred to as a TTI, and 1 slot or 1 minislot may be referred to as a TTI. That is, at least one of the subframe and the TTI may be a subframe (1 ms) of an existing LTE, an interval shorter than 1 ms (for example, 1 to 13 symbols), or an interval longer than 1 ms. The unit representing the TTI may be referred to as the slot, the minislot, or the like, rather than the subframe.

The TTI refers, for example, to the minimum time unit of the scheduling in the wireless communication. For example, in the LTE system, the base station performs the scheduling of each terminal 20 to allocate the wireless resources (such as frequency bandwidth, transmission power, or the like that are usable in each terminal 20) in units of TTI. The definition of the TTI is not limited to such.

The TTI may be a unit of transmission time, such as a channel-encoded data packet (transport block), code block, code word, or the like, or may be a unit of processing, such as scheduling, link adaptation, or the like. When the TTI is provided, the time interval (for example, the number of symbols) during which the transport block, code block, code word, or the like is actually mapped, may be shorter than the TTI.

When 1 slot or 1 minislot is referred to as the TTI, 1 or more TTIs (that is, 1 or more slots or 1 or more minislots) may become the minimum time unit of scheduling. The number of slots (minislots) forming the minimum time unit of the scheduling may also be controlled.

The TTI having a time length of 1 ms may be referred to as a regular TTI (TTI in LTE Rel. 8-12), a normal TTI, a long TTI, a regular subframe, a normal subframe, a long subframe, a slot, or the like. The TTI that is shorter than the regular TTI may be referred to as a reduced TTI, a short TTI, a partial TTI (partial or fractional TTI), a reduced subframe, a short subframe, a minislot, a subslot, a slot, or the like.

The long TTI (for example, regular TTI, subframe, or the like) may be alternatively referred to as a TTI having a time length exceeding 1 ms, and the short TTI (for example, reduced TTI, or the like) may be alternatively referred to as a TTI having a TTI length less than the TTI length of the long TTI and a TTI length of 1 ms or greater.

The resource block (RB) is a resource allocation unit in the time domain and the frequency domain, and may include 1 or a plurality of consecutive subcarriers (subcarriers) in the frequency domain. The number of subcarriers included in the RB may be the same, regardless of the numerology, and may be 12, for example. The number of subcarriers included in the RB may also be determined on the basis of numerology.

In addition, the time domain of the RB may include 1 or a plurality of symbols, and may have a length of 1 slot, 1 minislot, 1 subframe, or 1 TTI. 1 TTI, 1 subframe, or the like may each be formed by 1 or a plurality of resource blocks.

1 or a plurality of RBs may be referred to as physical resource blocks (PRBs: Physical RBs), sub-carrier groups (SCGs: Sub-Carrier Groups), resource element groups (REGs: Resource Element groups), PRB pairs, RB pairs, or the like.

In addition, the resource block may be formed by 1 or a plurality of resource elements (Res: Resource Elements). For example, 1 RE may be a wireless resource area of 1 sub-carrier and 1 symbol.

The bandwidth part (BWP: BandWidth Part, which may also be referred to as a partial bandwidth, or the like) may represent a subset of consecutive common RBs (common resource blocks) for a given numerology in a certain carrier. Here, the common RB may be identified by an index of the RB with reference to a common reference point of the carrier. A PRB is defined in a certain BWP, and may be numbered within that BWP.

The BWP may include a BWP for UL (UL BWP), and a BWP for DL (DL BWP). 1 or a plurality of BWPs may be configured in one carrier with respect to the terminal 20.

At least 1 of the configured BWPs may be active, and the terminal 20 need not expect to transmit and receive predetermined signals/channels outside the active BWP. The terms "cell", "carrier", or the like in present disclosure may be alternatively referred to as "BWP."

Structures of the wireless frame, subframe, slot, minislot, symbol, or the like described above are exemplary only. For example, the number of subframes included in the wireless frame, the number of slots per subframe or wireless frame, the number of minislots included in the slot, the number of symbols and RBs included in the slot or minislot, the number of subcarriers included in the RB, the number of symbols in the TTI, the symbol length, the length of the cyclic prefix (CP: Cyclic Prefix), or the like may be variously modified.

In present disclosure, in cases where articles such as "a", "an", and "the" in English are added during translation, these articles may include indicating plural items of the noun that follows.

In present disclosure, the term "A and B are different" may mean "A and B are different from each other." Incidentally, the term may mean "A and B are different from C, respectively". Terms such as "separated", "combined", or the like may be interpreted similar to "different".

The examples/embodiments described in the present disclosure may be used by itself, in combination, or switched during implementation. Further, indication of predetermined information (for example, indication that "it is X") it not limited to indications performed explicitly, and may include indications performed implicitly (for example, not indicating the predetermined information).

Incidentally, the DCI in the present disclosure is an example of the DL control information. The PUCCH is an example of the UL control channel.

The present disclosure is described above in detail, however, it may be apparent to those skilled in the art that the present disclosure is not limited to the embodiments described in the present disclosure. Various variations and modifications may be made without departing from the scope of the present disclosure determined by recitations of the claims. The description in the present disclosure is exemplary, and the description in no way limits the scope of the present disclosure.

DESCRIPTION OF THE REFERENCE NUMERALS

10 Base station
110 Transmission unit
120 Reception unit
130 Configuration unit
140 Control unit
20 Terminal
210 Transmission unit
220 Reception unit
230 Configuration unit
240 Control unit
1001 Processor
1002 Storage device
1003 Auxiliary storage device
1004 Communication device
1005 Input device
1006 Output device

The invention claimed is:

1. A terminal comprising:
a receiver that receives a configured grant or a dynamic grant, from a base station; and
a processor that determines a control related to a Hybrid Automatic Repeat Request (HARQ) response to the base station, based on whether a report of HARQ response information is requested by the base station, in a case where transmission data to be transmitted via a sidelink (SL) resource provided by the configured grant or the dynamic grant, is not present,
wherein the processor determines the HARQ response to the base station is to be a positive acknowledgement, in a case where the transmission data to be transmitted via the SL resource is not present, and where the report of the HARQ response information corresponding to the SL resource is requested.

2. The terminal as claimed in claim 1, wherein the processor control unit determines the HARQ response is not to be transmitted to the base station, in a case where the report of the HARQ response information is not requested.

3. A base station comprising:
a transmitter that transmits a configured grant or a dynamic grant to a terminal, the configured grant or the dynamic grant providing a sidelink (SL) resource; and
a processor that assumes that the terminal determines a control related to a Hybrid Automatic Repeat Request (HARQ) response to the base station, based on whether a report of HARQ response information is requested by the base station, in a case where transmission data to be transmitted via the SL resource provided by the configured grant or the dynamic grant, is not present, wherein the processor controls the terminal to determine the HARQ response to the base station is to be a positive acknowledgement, in a case where the transmission data to be transmitted via the SL resource is not present, and where the report of the HARQ response information corresponding to the SL resource is requested.

4. A communication method performed by a terminal, comprising:
- receiving a configured grant or a dynamic grant, from a base station;
- determining a control related to a Hybrid Automatic Repeat Request (HARQ) response to the base station, based on whether a report of HARQ response information is requested by the base station, in a case where transmission data to be transmitted via a sidelink (SL) resource provided by the configured grant or the dynamic grant, is not present; and
- determining the HARQ response to the base station is to be a positive acknowledgement, in a case where the transmission data to be transmitted via the SL resource is not present, and where the report of the HARQ response information corresponding to the SL resource is requested.

5. A communication system comprising: a base station; and a terminal, wherein the base station includes:
- a transmitter that transmits a configured grant or a dynamic grant to a terminal, the configured grant or the dynamic grant providing a sidelink (SL) resource, and the terminal includes:
- a receiver reception unit that receives a configured grant or a dynamic grant, from the base station; and
- a processor determines a control related to a Hybrid Automatic Repeat Request (HARQ) response to the base station, based on whether a report of HARQ response information is requested by the base station, in a case where transmission data to be transmitted via a sidelink (SL) resource provided by the configured grant or the dynamic grant, is not present,
- wherein the processor determines the HARQ response to the base station is to be a positive acknowledgement, in a case where the transmission data to be transmitted via the SL resource is not present, and where the report of the HARQ response information corresponding to the SL resource is requested.

* * * * *